(12) United States Patent
Patel et al.

(10) Patent No.: US 9,774,429 B2
(45) Date of Patent: Sep. 26, 2017

(54) TECHNIQUES FOR TRANSMITTING POSITIONING REFERENCE SIGNALS IN AN UNLICENSED RADIO FREQUENCY SPECTRUM BAND

(71) Applicant: QUALCOMM Incorporated, San Diego, CA (US)

(72) Inventors: Shimman Arvind Patel, San Diego, CA (US); Wanshi Chen, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 192 days.

(21) Appl. No.: 14/577,783

(22) Filed: Dec. 19, 2014

(65) Prior Publication Data
US 2015/0263837 A1   Sep. 17, 2015

Related U.S. Application Data

(60) Provisional application No. 61/951,895, filed on Mar. 12, 2014.

(51) Int. Cl.
| | |
|---|---|
| *H04L 5/00* | (2006.01) |
| *H04W 72/04* | (2009.01) |
| *H04L 27/00* | (2006.01) |
| *H04W 16/14* | (2009.01) |

(52) U.S. Cl.
CPC ........ *H04L 5/0048* (2013.01); *H04L 27/0006* (2013.01); *H04W 72/0453* (2013.01); *H04W 16/14* (2013.01)

(58) Field of Classification Search
None
See application file for complete search history.

(56) References Cited

U.S. PATENT DOCUMENTS

| | | | | |
|---|---|---|---|---|
| 2008/0129591 A1* | 6/2008 | Lamance | ............... | G01S 19/05 342/357.42 |
| 2009/0190566 A1* | 7/2009 | Kwon | .................. | H04W 74/02 370/345 |
| 2011/0158200 A1* | 6/2011 | Bachu | .................. | H04L 5/0007 370/330 |
| 2011/0275385 A1* | 11/2011 | Escolar-Piedras | .... | H04W 64/00 455/456.1 |

(Continued)

FOREIGN PATENT DOCUMENTS

WO    WO-2012116007 A1    8/2012

OTHER PUBLICATIONS

ISA/EPO, International Search Report and Written Opinion of the International Searching Authority, Int'l App. No. PCT/US2015/018287, May 7, 2015, European Patent Office, Rijswijk, NL, 11 pgs.

(Continued)

*Primary Examiner* — Edan Orgad
*Assistant Examiner* — Saumit Shah
(74) *Attorney, Agent, or Firm* — Holland & Hart

(57) ABSTRACT

Techniques are described for wireless communication. In one method, a positioning reference signal (PRS) may be generated. The PRS may be configured in at least one downlink subframe among a plurality of downlink subframes. The PRS may be transmitted in the at least one downlink subframe using an unlicensed radio frequency spectrum band.

30 Claims, 18 Drawing Sheets

(56) References Cited

U.S. PATENT DOCUMENTS

| | | |
|---|---|---|
| 2011/0312330 A1 | 12/2011 | Sadek et al. |
| 2013/0023285 A1 | 1/2013 | Markhovsky et al. |
| 2013/0040673 A1* | 2/2013 | Siomina ................ G01S 5/0226 455/501 |
| 2013/0336156 A1* | 12/2013 | Wei ......................... H04L 5/001 370/252 |
| 2014/0036881 A1 | 2/2014 | Kim et al. |
| 2015/0223241 A1* | 8/2015 | Cattoni ................ H04L 5/0044 370/329 |

OTHER PUBLICATIONS

IPEA/EPO, Second Written Opinion of the International Preliminary Examining Authority, Int'l App. No. PCT/US2015/018287, Jan. 22, 2016, European Patent Office, Rijswijk, NL, 7 pgs.

* cited by examiner

TECHNIQUES FOR TRANSMITTING POSITIONING REFERENCE SIGNALS IN AN UNLICENSED RADIO FREQUENCY SPECTRUM BAND

CROSS REFERENCES

The present Application for Patent claims priority to U.S. Provisional Patent Application No. 61/951,895 by Patel et al., entitled "Techniques For Transmitting Positioning Reference Signals in An Unlicensed Radio Frequency Spectrum Band," filed Mar. 12, 2014, assigned to the assignee hereof, which is hereby incorporated by reference in its entirety.

FIELD OF THE DISCLOSURE

The present disclosure, for example, relates to wireless communication systems, and more particularly to techniques for transmitting positioning reference signals in an unlicensed radio frequency spectrum band.

BACKGROUND

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple user equipments (UEs; e.g., mobile devices). A base station may communicate with UEs on downlink channels (e.g., for transmissions from a base station to a UE) and uplink channels (e.g., for transmissions from a UE to a base station).

Some modes of communication may enable communication with a UE over different radio frequency spectrum bands (e.g., a licensed radio frequency spectrum band and/or an unlicensed radio frequency spectrum band). With increasing data traffic in cellular networks, the offloading of at least some data traffic from a licensed radio frequency spectrum band to an unlicensed radio frequency spectrum band may provide a cellular operator with opportunities for enhanced data transmission capacity. In other examples, an unlicensed radio frequency spectrum band may be used in a standalone mode where access to a licensed radio frequency spectrum band is not available.

Prior to transmitting data over an unlicensed radio frequency spectrum band, a transmitting apparatus may, in some examples, perform a clear channel assessment (CCA) procedure to gain access to the unlicensed radio frequency spectrum band. A CCA procedure may determine whether a particular channel of the unlicensed radio frequency spectrum band is available. When it is determined that the channel of the unlicensed radio frequency spectrum band is not available (e.g., because another device is already using the channel of the unlicensed radio frequency spectrum band), a CCA may be performed for the channel of the unlicensed radio frequency spectrum band again at a later time.

Because a base station may contend for access to an unlicensed radio frequency spectrum band, there is a chance that the base station may be unable to transmit a periodic signal such as a positioning reference signal (PRS) at a predetermined time period interval. When one or more base stations fail to transmit a PRS, a UE loses one or more opportunities to make PRS measurements, and it may not be possible to determine an accurate position of the UE from its PRS measurements.

SUMMARY

The present disclosure, for example, relates to one or more techniques for transmitting positioning reference signals in an unlicensed radio frequency spectrum band. A base station may, in some examples, periodically transmit a PRS adjacent a CCA exempt transmission (CET) and leverage the CCA exempt property of the CET. To leverage the CCA exempt property of the CET, the base station may transmit the PRS adjacent the CET such that a combined duration of the PRS and the CET is less than a maximum allowed duration of the CET. For example, the base station may transmit the PRS contiguously with the CET. In other examples, a base station may contend for access to an unlicensed radio frequency spectrum band and may transmit a PRS when winning contention for access to the unlicensed radio frequency spectrum band. When a base station does not win contention for access to an unlicensed radio frequency spectrum band for a period of time (e.g., a plurality of gating intervals), the base station may determine statistics (e.g., CCA clearance statistics) to improve the likelihood that a receiver (e.g., a UE) receives enough PRS transmissions to determine an accurate position of the UE. The base station may also receive statistics (e.g., CCA clearance statistics) from one or more UEs and/or other base stations. The base station may configure parameters of subsequent PRS transmissions and/or PRS measurements based on the statistics.

In a first set of illustrative examples, a method for wireless communication is described. In one example, the method may include generating a PRS; configuring the PRS in at least one downlink subframe among a plurality of downlink subframes; and transmitting the PRS in the at least one downlink subframe using an unlicensed radio frequency spectrum band.

In some examples, the configuring the PRS in the at least one downlink subframe may include configuring the PRS to be adjacent a CET. In some examples, a combined duration of the PRS and the CET is less than a maximum allowed duration of the CET. In some examples, the transmitting the PRS may include periodically transmitting the PRS adjacent the CET. In some examples, the periodically transmitting the PRS adjacent the CET may include transmitting the PRS adjacent the CET according to a first periodicity and a first phase offset. In some examples, the first periodicity may differ from a second periodicity at which the CET is transmitted. In some examples, the first periodicity may be a variable periodicity.

In some examples in which the configuring the PRS in the at least one downlink subframe may include configuring the PRS to be adjacent a CET, the method may further include signaling a receiver of a timing of the transmitting the PRS adjacent the CET. In some examples, the transmitting the PRS may include transmitting the PRS contiguously with the CET. In some examples, the transmitting the PRS may include time synchronizing the transmitting the PRS, by a first transmitter, with a transmission of at least a second PRS by at least a second transmitter. In some examples, the transmitting the PRS may include transmitting the PRS, by a first transmitter, with a same periodicity as, and different phase offset than, a transmission of at least a second PRS by at least a second transmitter. In some examples, the transmitting the PRS may include transmitting the PRS, by a first transmitter, with a different periodicity than a transmission of at least a second PRS by at least a second transmitter. In some examples, the transmitting the PRS may include transmitting the PRS before the CET. In some examples, the transmitting the PRS may include transmitting the PRS after the CET. In some examples, the method may further include associating the PRS with a muting parameter. In some examples, the method may further include associating the PRS with a variable cell-specific frequency shift parameter.

In some examples, the transmitting the PRS may include transmitting the PRS to occupy a portion of the unlicensed radio frequency spectrum band less than all of the unlicensed radio frequency spectrum band. In some examples, the transmitting the PRS may include transmitting the PRS across a plurality of frequencies of the unlicensed radio frequency spectrum band.

In some examples, the configuring the PRS in the at least one downlink subframe may include configuring the PRS in at least one downlink subframe of a CCA frame. In some examples, the method may further include determining whether a CCA procedure failed, and gating off a transmission of the PRS based at least in part on the determining the CCA procedure failed. In some examples, the method may further include receiving at least one CCA clearance statistic related to at least one PRS measurement, and determining whether at least one additional PRS measurement may be needed based at least in part on the at least one CCA clearance statistic related to the at least one PRS measurement. In some examples, the at least one CCA clearance statistic related to the at least one PRS measurement may be received from at least one UE. In some examples, the at least one CCA clearance statistic related to the at least one PRS measurement may be received from at least one evolved NodeB (eNB). In some examples, the method may further include configuring the transmitting the PRS based at least in part on the at least one CCA clearance statistic related to the at least one PRS measurement, to increase a number of PRS transmissions within a measurement period. In some examples, the method may further include configuring the at least one additional PRS measurement based at least in part on the at least one CCA clearance statistic related to the at least one PRS measurement. In some examples, the method may include transmitting an indication to a receiver to use prior reference signal time difference (RSTD) measurements based at least in part on a prior PRS transmission.

In some examples, the method may further include receiving a set of RSTD measurements collected for each of a plurality of known locations, and transmitting the received set of RSTD measurements to be stored in a database. In some examples, the method may include receiving at least one RSTD measurement and at least one reference signal strength indicator (RSSI) associated with an unknown location, and estimating a position of the unknown location based at least in part on the at least one RSTD measurement and the at least one RSSI associated with the unknown location, and the set of RSTD measurements stored in the database.

In a second set of illustrative examples, an apparatus for wireless communication is described. In one example, the apparatus may include means for generating a PRS; means for configuring the PRS in at least one downlink subframe among a plurality of downlink subframes; and means for transmitting the PRS in the at least one downlink subframe using an unlicensed radio frequency spectrum band. In some examples, the apparatus may further include means for implementing one or more aspects of the method for wireless communication described above with respect to the first set of illustrative examples.

In a third set of illustrative examples, another apparatus for wireless communication is described. In one example, the apparatus for wireless communication may include a processor, memory in electronic communication with the processor, and instructions stored in the memory. The instructions may be executable by the processor to generate a PRS, configure the PRS in at least one downlink subframe among a plurality of downlink subframes, and transmit the PRS in the at least one downlink subframe using an unlicensed radio frequency spectrum band. In some examples, the instructions may also be executable by the processor to implement one or more aspects of the method for wireless communication described above with respect to the first set of illustrative examples.

In a fourth set of illustrative examples, a computer program product for communication by a wireless communication apparatus in a wireless communication system is described. In one example, the computer program product may include a non-transitory computer-readable medium storing computer-executable code executable by a processor to cause the wireless communication apparatus to generate a PRS, configure the PRS in at least one downlink subframe among a plurality of downlink subframes, and transmit the PRS in the at least one downlink subframe using an unlicensed radio frequency spectrum band. In some examples, the instructions may also be executable by the processor to cause the wireless communication apparatus to implement one or more aspects of the method for wireless communication described above with respect to the first set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
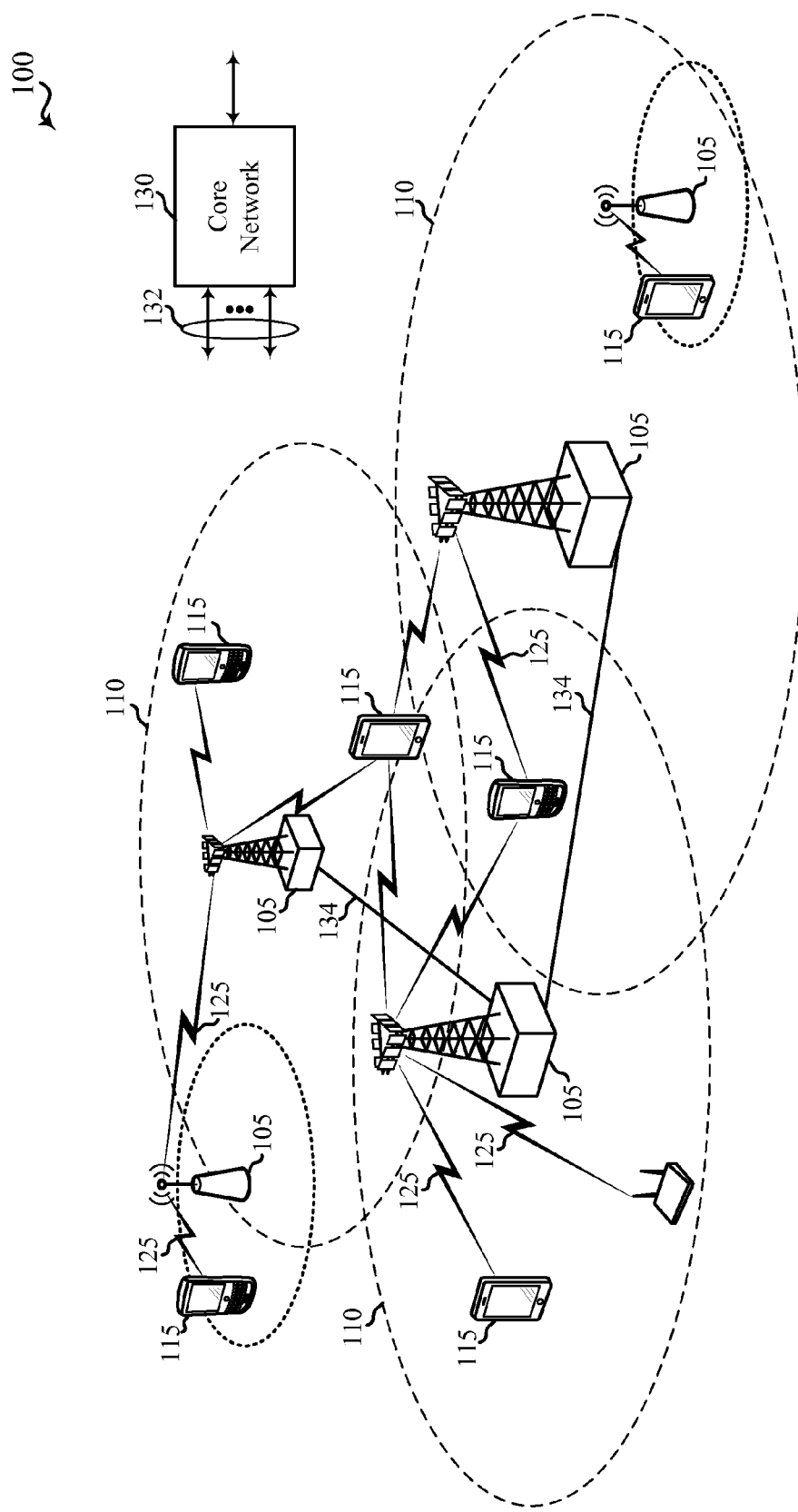
FIG. 1 shows a diagram of an example of a wireless communication system, in accordance with various aspects of the present disclosure.

Techniques are described in which positioning reference signals are transmitted in an unlicensed radio frequency spectrum band. In some examples, a base station may contend for access to an unlicensed radio frequency spectrum band, and at times may not gain access to the unlicensed radio frequency spectrum band when access is needed to transmit a PRS. As a result, a base station may, in some examples, periodically transmit a PRS adjacent a CCA exempt transmission (CET) and leverage the CCA exempt property of the CET. To leverage the CCA exempt property of the CET, the base station may transmit the PRS adjacent the CET such that a combined duration of the PRS and the CET is less than a maximum allowed duration of the CET. For example, the base station may transmit the PRS contiguously with the CET. In other examples, a base station may contend for access to an unlicensed radio frequency spectrum band and may transmit a PRS when winning contention for access to the unlicensed radio frequency spectrum band. When a base station does not win contention for access to an unlicensed radio frequency spectrum band for a period of time (e.g., a plurality of gating intervals), the base station may determine statistics (e.g., CCA clearance statistics) to improve the likelihood that a receiver (e.g., a UE) receives enough PRS transmissions to determine an accurate position of the UE. The base station may also receive statistics (e.g., CCA clearance statistics) from one or more UEs and/or other base stations. The base station may configure parameters of subsequent PRS transmissions and/or PRS measurements based on the statistics.

Techniques are also described in which a base station or other apparatus may receive a set of reference signal time difference (RSTD) measurements collected for each of a plurality of known locations and store the received set of measurements in a database. The set of measurements may in some cases be collected by one or more receivers (e.g., one or more test UEs) that receive PRS transmissions, determine a set of RSTD measurements, and transmit the set of RSTD measurements along with location information to the base station or other apparatus. The set of measurements stored in a base station or other apparatus may be used to determine locations of one or more receivers (e.g., one or more UEs). For example, the base station or other apparatus may receive at least one RSTD measurement and at least one reference signal strength indicator (RSSI) associated with an unknown location (e.g., from a UE in an unknown location) and estimate a position of the unknown location based at least in part on the at least one RSTD measurement and the at least one RSSI associated with the unknown location, and the set of measurements (for the known locations) stored in the database. In an example, the base station may determine one or more RSTD measurements from the set of measurements (for the known location) that may be similar to the at least one RSTD measurements and the at least one RSSI associated with the unknown location to estimate the position of the unknown location. The use of RSTD measurements in this manner may provide more accurate position information than RSSI alone.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or examples set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

FIG. 1 shows a diagram of an example of a wireless communication system 100, in accordance with various aspects of the present disclosure. The wireless communication system 100 may include base stations (or cells) 105, UEs 115, and a core network 130. The base stations 105 may communicate with the UEs 115 under the control of a base station controller (not shown), which may be part of the core network 130 or the base stations 105 in various examples. The base stations 105 may communicate control information and/or user data with the core network 130 through backhaul links 132. Backhaul links 132 may be wired backhaul links (e.g., copper, fiber, etc.) and/or wireless backhaul links (e.g., microwave, etc.). In some examples, the base stations 105 may communicate, either directly or indirectly, with each other over backhaul links 134, which may be wired or wireless communication links. The wireless communication system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base stations 105 may provide communication coverage for a respective coverage area 110. In some examples, a base station 105 may be referred to as an access point, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a Wi-Fi node or some other suitable terminology. The coverage area 110 for a base station 105 may be divided into sectors making up only a portion of the coverage area. The wireless communication system 100 may include base stations 105 of different types (e.g., macro, micro, and/or pico base stations). The base stations 105 may also utilize different radio technologies, such as cellular and/or WLAN radio access technologies. The base stations 105 may be associated with the same or different access networks or operator deployments. The coverage areas of different base stations 105, including the coverage areas of the same or different types of base stations 105, utilizing the same or different radio technologies, and/or belonging to the same or different access networks, may overlap.

The UEs 115 may be dispersed throughout the wireless communication system 100. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro base stations, pico base stations, femto base stations, relay base stations, and the like. A UE 115 may also be able to communicate over different types of access networks, such as cellular or other WWAN access networks, or WLAN access networks. In some modes of communication with a UE 115, communication may be conducted over a plurality of communication links 125 or channels, with each channel using a component carrier between the UE 115 and one of a number of cells (e.g., serving cells, which cells may in some cases be operated by the same or different base stations 105).

Each component carrier may be provided over a licensed radio frequency spectrum band or an unlicensed radio frequency spectrum band, and a set of component carriers used in a mode of communication may all be received (e.g., at a UE 115) over a licensed radio frequency spectrum band, all be received (e.g., at a UE 115) over an unlicensed radio frequency spectrum band, or be received (e.g., at a UE 115) over a combination of a licensed radio frequency spectrum band and an unlicensed radio frequency spectrum band.

The communication links 125 shown in wireless communication system 100 may include uplink channels (using component carriers) for carrying uplink (UL) communications (e.g., transmissions from a UE 115 to a base station 105) and/or downlink channels (using component carriers) for carrying downlink (DL) communications (e.g., transmissions from a base station 105 to a UE 115). The UL communications or transmissions may also be called reverse link communications or transmissions, while the DL communications or transmissions may also be called forward link communications or transmissions. The downlink communications and/or uplink communications may be made using a licensed radio frequency spectrum band, an unlicensed radio frequency spectrum band, or both.

In some examples, the wireless communication system 100 may be or include an LTE/LTE-A network. In LTE/LTE-A networks, the terms evolved Node B (eNB) may be generally used to describe individual ones or groups of the base stations 105. The wireless communication system 100 may be a Heterogeneous LTE/LTE-A network in which different types of eNBs provide coverage for various geographical regions. For example, each eNB may provide communication coverage for a macro cell, a pico cell, a femto cell, and/or other type of cell. A macro cell may generally cover a relatively large geographic area (e.g., several kilometers in radius) and may allow unrestricted access by UEs 115 having service subscriptions with the network provider. A pico cell may generally cover a relatively smaller geographic area and may allow unrestricted access by UEs 115 with service subscriptions with the network provider. A femto cell may also generally cover a relatively small geographic area (e.g., a home) and, in addition to unrestricted access, may also provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The wireless communication system 100 according to an LTE/LTE-A network architecture may be referred to as an Evolved Packet System (EPS). An EPS may include one or more UEs 115, an Evolved UMTS Terrestrial Radio Access Network (E-UTRAN), an Evolved Packet Core (EPC) (e.g., core network 130), a Home Subscriber Server (HSS), and an Operator's IP Services. The EPS may interconnect with other access networks using other Radio Access Technologies. For example, the EPS may interconnect with a UTRAN-based network and/or a CDMA-based network via one or more Serving GPRS Support Nodes (SGSNs). To support mobility of UEs 115 and/or load balancing, the EPS may support handover of UEs 115 between a source eNB (or base station 105) and a target eNB (or base station 105). The EPS may support intra-RAT handover between eNBs and/or base stations 105 of the same RAT (e.g., other E-UTRAN networks), and inter-RAT handovers between eNBs and/or base stations 105 of different RATs (e.g., E-UTRAN to CDMA, etc.). The EPS may provide packet-switched services, however, as those skilled in the art will readily appreciate, the various concepts presented throughout this disclosure may be extended to networks providing circuit-switched services.

The E-UTRAN may include eNBs and may provide user plane and control plane protocol terminations toward the UEs 115. The eNBs and/or base stations 105 may be connected to other eNBs and/or base stations 105 via backhaul link 134 (e.g., an X2 interface and/or the like). The eNBs and/or base stations 105 may provide access points to the EPC (e.g., the core network 130) for the UEs 115. The eNBs and/or base stations 105 may be connected by backhaul link 132 (e.g., an S1 interface and/or the like) to the EPC. Logical nodes within the EPC may include one or more Mobility Management Entities (MMEs), one or more Serving Gateways, and one or more Packet Data Network (PDN) Gateways (not shown). Generally, the MME may provide bearer and connection management. All user IP packets may be transferred through the Serving Gateway, which itself may be connected to the PDN Gateway. The PDN Gateway may provide UE IP address allocation as well as other functions. The PDN Gateway may be connected to IP networks and/or the Operator's IP Services. These logical nodes may be implemented in separate physical nodes or one or more logical nodes may be combined in a single physical node. The IP Networks/Operator's IP Services may include the Internet, an Intranet, an IP Multimedia Subsystem (IMS), and/or a Packet-Switched (PS) Streaming Service (PSS).

UEs 115 and eNBs or base stations 105 may be configured to collaboratively communicate through, for example, Multiple Input Multiple Output (MIMO), Coordinated Multi-Point (CoMP), or other schemes. MIMO techniques use multiple antennas on a base station 105 and/or multiple antennas on a UE 115 to take advantage of multipath environments to transmit multiple data streams. CoMP includes techniques for dynamic coordination of transmission and reception by a number of eNBs and/or base stations 105 to improve overall transmission quality for UEs 115, as well as to increase network and spectrum utilization. Generally, CoMP techniques may utilize backhaul links 132 and/or 134 for communication between base stations 105 to coordinate control plane and user plane communications for the UEs 115.

The communication networks that may accommodate some of the various disclosed techniques may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) techniques to provide retransmission at the MAC layer to ensure reliable data transmission. In the control plane, the Radio Resource Control (RRC) protocol layer may provide establishment, configuration, and maintenance of an RRC connection between the UE and the network used for the user plane data. At the Physical layer, the transport channels may be mapped to physical channels.

The downlink physical channels may include at least one of a physical downlink control channel (PDCCH), a physical HARQ indicator channel (PHICH), and a physical downlink shared channel (PDSCH). The uplink physical channels may include at least one of a physical uplink control channel (PUCCH) and a physical uplink shared channel (PUSCH). The PDCCH may carry downlink control information (DCI), which may indicate data transmissions for UEs on the PDSCH as well as provide UL resource grants to UEs for the PUSCH. The UE may transmit control information in the PUCCH on the assigned resource blocks in the control section. The UE may transmit only data or both data and control information in the PUSCH on the assigned resource blocks in the data section.

LTE/LTE-A utilizes orthogonal frequency division multiple-access (OFDMA) on the downlink and single-carrier frequency division multiple-access (SC-FDMA) on the uplink. An OFDMA and/or SC-FDMA carrier may be partitioned into multiple (K) orthogonal subcarriers, which are also commonly referred to as tones, bins, or the like. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guard band) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands.

In some examples of the wireless communication system 100, LTE/LTE-A may be deployed under different scenarios using an unlicensed radio frequency spectrum band. The deployment scenarios may include a supplemental downlink mode in which LTE/LTE-A downlink communications in a licensed radio frequency spectrum band may be offloaded to an unlicensed radio frequency spectrum band, a carrier aggregation mode in which both LTE/LTE-A downlink and uplink communications may be offloaded from a licensed radio frequency spectrum band to an unlicensed radio frequency spectrum band, and a standalone mode in which LTE/LTE-A downlink and uplink communications between an eNB and/or base station and a UE may take place in an unlicensed radio frequency spectrum band. Base stations 105 as well as UEs 115 may support one or more of these or similar modes of operation. OFDMA waveforms may be used in the communication links 125 for LTE/LTE-A downlink communications in the licensed radio frequency spectrum band and/or the unlicensed radio frequency spectrum band, while OFDMA, SC-FDMA and/or resource block interleaved FDMA waveforms may be used in the communication links 125 for LTE/LTE-A uplink communications in the licensed radio frequency spectrum band and/or unlicensed radio frequency spectrum band.

Figure 2:
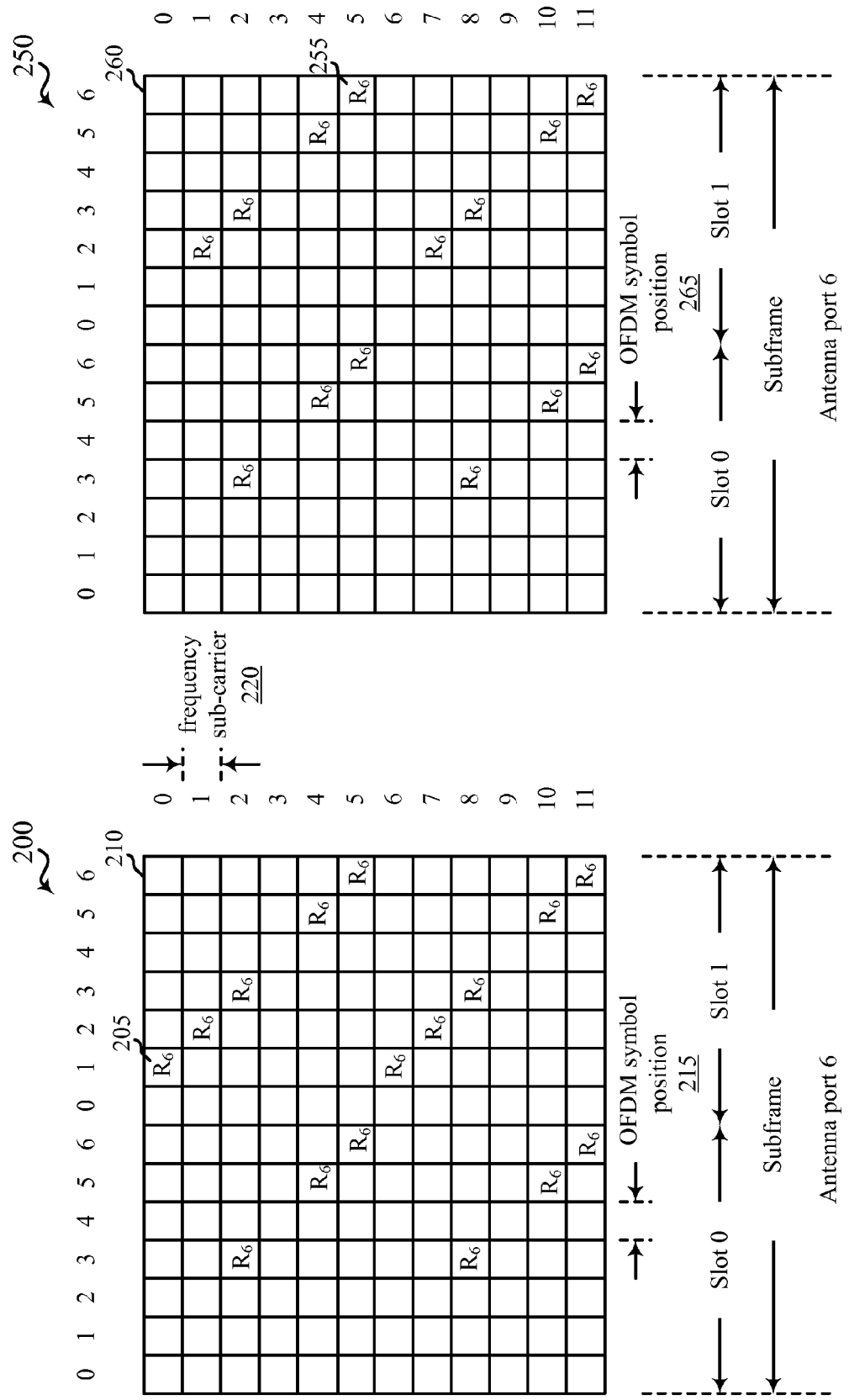
FIG. 2A shows a downlink channel resource block in which a PRS may be transmitted in a downlink channel, in accordance with various aspects of the present disclosure.
FIG. 2B shows a downlink channel resource block in which a PRS may be transmitted in a downlink channel, in accordance with various aspects of the present disclosure.

FIG. 2A shows a downlink channel resource block 200 in which a positioning reference signal (PRS) 205 may be transmitted in a downlink channel, in accordance with various aspects of the present disclosure. By way of example, the downlink channel resource block 200 may be transmitted by one of the base stations 105 described with reference to FIG. 1. By way of further example, the PRS 205 shown in FIG. 2A may be a PRS 205 mapped to antenna port 6 of the LTE/LTE-A New Carrier Type (NCT). The PRS 205 may be transmitted on one or two PBCH antenna ports.

The downlink channel resource block 200 includes a plurality of resource elements 210. Each resource element 210 may correspond to one of a number of symbol periods (e.g., OFDM symbol positions 215) and one of a number of frequency sub-carriers 220. By way of example, the downlink channel resource block 200 includes resource elements spanning fourteen OFDM symbol positions (or two slots, labeled Slot 0 and Slot 1; or one Subframe) and twelve frequency sub-carriers.

By way of further example, the PRS 205 may be transmitted in a set of one or more resource elements 210 of the downlink channel resource block 200, such as, in the resource elements labeled $R_6$.

The PRS 205 may have a number of configurable parameters. For example, the PRS 205 may have a configuration index, $I_{PRS}$, mapped to the parameters $T_{PRS}$ and $\Delta_{PRS}$, where $T_{PRS}$ is a periodicity (e.g., 160, 320, 640, or 1280 ms) of transmissions of the PRS 205, and where $\Delta_{PRS}$ is a subframe offset (e.g., a subframe offset of 0 to 1120). The PRS 205 may also have configuration parameters such as a duration, $N_{PRS}$; a number, M, of consecutive transmissions defining a measurement period; muting information (e.g., a muting parameter); a variable cell-specific frequency shift parameter, $V_{shift}$; a PRS bandwidth; and a number, n, of cells to measure. The duration, $N_{PRS}$, may define a number of consecutive downlink subframes included in a PRS transmission (e.g., 1, 2, 4, or 6). The number of consecutive PRS transmissions defining a measurement period may depend on an intra-frequency or inter-frequency configuration of the PRS, and may in some cases be 8, 16, or 32. The muting information may mask PRS transmissions with a periodicity of 2, 4, 8, or 16. The variable cell-specific frequency shift parameter, $V_{shift}$, may in some examples be a value between 1 and 6, enabling a reuse factor of 6. The PRS bandwidth may in some examples be configured as 6, 15, 25, 50, 75, or 100 resource blocks. The number of cells to measure, n, may be any number of cells for which PRS measurements may be made.

A UE such as one of the UEs 115 described with reference to FIG. 1 may receive a PRS such as the PRS 205 from one or a plurality of base stations 105 and/or eNBs. The UE may also receive signaling from the base stations and/or eNBs. The signaling may indicate configuration parameters for an observed time difference of arrival (OTDOA) reference cell and one or more OTDOA neighboring cells. In some examples, an OTDOA-ReferenceCell Info message may indicate configuration parameters for the OTDOA reference cell, and one or more OTDOA-NeighborCell Info messages may indicate configuration parameters for one or more OTDOA neighboring cells. The OTDOA-NeighborCell Info messages may include a slot timing offset and a PRS subframe offset between the reference cell and neighboring cells. The slot timing offset and the PRS subframe offset may be used for inter-frequency PRS transmissions, where base station and/or eNB transmission timing differences may exceed one subframe. An OTDOA-NeighborCell Info message also enables the use of PRS transmissions in inter-frequency and carrier aggregation mode scenarios.

A UE may make multiple PRS measurements and report a reference signal time difference (RSTD) for n−1 neighboring cells within a measurement period, $T_{RSTD}$, from the start of an initial PRS transmission. A UE may be required to make a particular number of suitable PRS measurements (e.g., M/2 suitable measurements) within the measurement period, $T_{RSTD}$, before its PRS measurements are deemed useful.

The PRS transmissions of multiple base stations and/or eNBs of a single operator may be synchronized across a same frequency to reduce interference. However, in dense deployments of base stations and/or eNBs, a base station and/or eNB may mute its PRS transmission in accordance with a muting pattern.

FIG. 2B shows a downlink channel resource block 250 in which a PRS 255 may be transmitted in a downlink channel, in accordance with various aspects of the present disclosure. By way of example, the PRS 255 shown in FIG. 2B may be a PRS 255 mapped to antenna port 6 of the LTE/LTE-A New Carrier Type (NCT). The PRS 255 may be transmitted on four PBCH antenna ports.

The downlink channel resource block 250 includes a plurality of resource elements 260. Each resource element 260 may correspond to one of a number of symbol periods (e.g., OFDM symbol positions 265) and one of a number of frequency sub-carriers 220. By way of example, the downlink channel resource block 250 includes resource elements spanning fourteen OFDM symbol positions (or two slots, labeled Slot 0 and Slot 1; or one Subframe) and twelve frequency sub-carriers.

By way of further example, the PRS 255 may be transmitted in a set of one or more resource elements 260 of the downlink channel resource block 250, such as, in the resource elements labeled $R_6$. But for the locations of the resource elements 260 defining the PRS 255, the downlink channel resource block 250 and PRS 255 may be configured similarly to the downlink channel resource block 200 and PRS 205.

Figure 3:
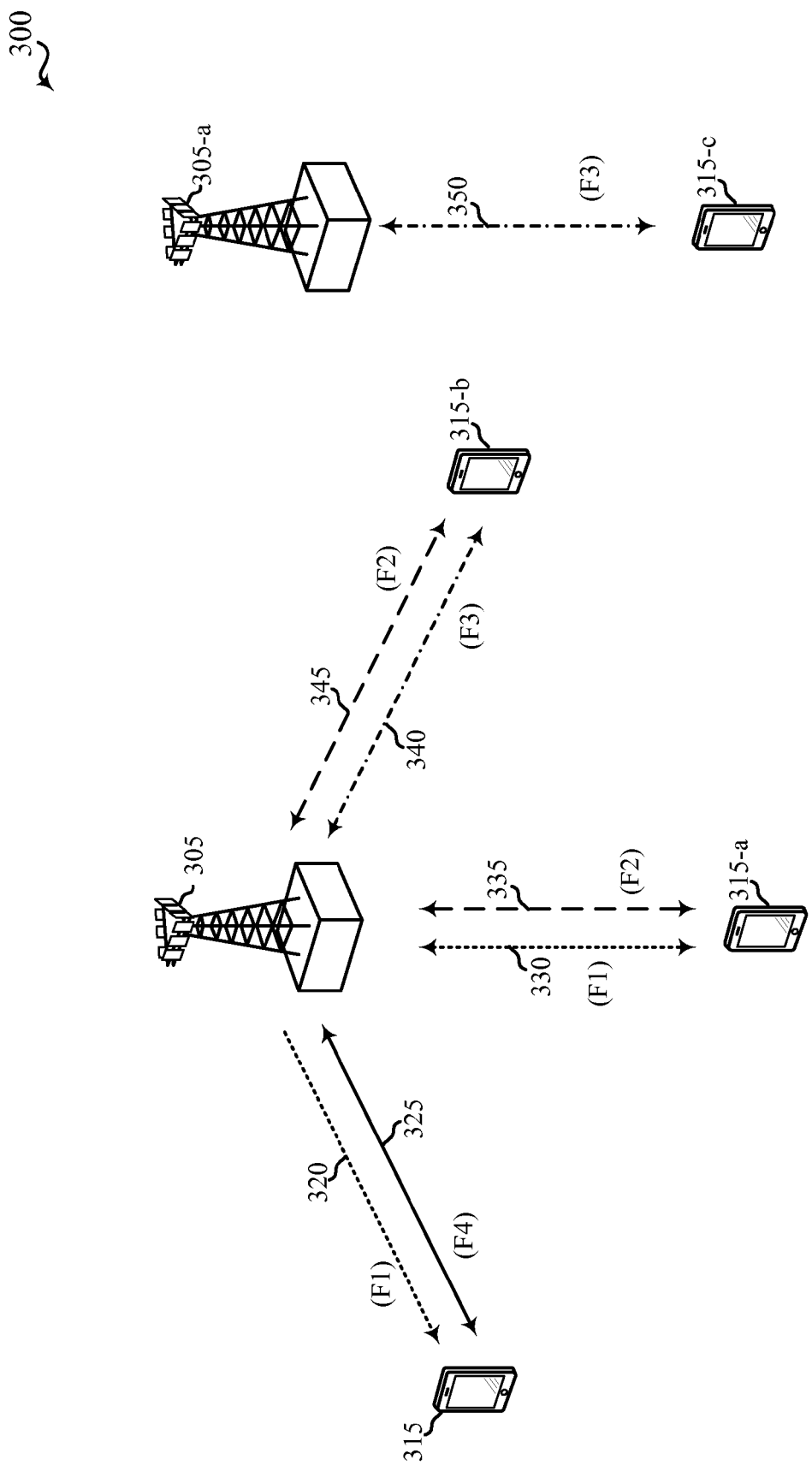
FIG. 3 shows a wireless communication system in which LTE/LTE-A is deployed under different scenarios using an unlicensed radio frequency spectrum band, in accordance with various aspects of the present disclosure.

FIG. 3 shows a wireless communication system 300 in which LTE/LTE-A is deployed under different scenarios using an unlicensed radio frequency spectrum band, in accordance with various aspects of the present disclosure.

More specifically, FIG. 3 illustrates examples of a supplemental downlink mode, a carrier aggregation mode, and a standalone mode in which LTE/LTE-A is deployed using an unlicensed radio frequency spectrum band. The wireless communication system 300 may be an example of portions of the wireless communication system 100 described with reference to FIG. 1. Moreover, a first base station 305 and a second base station 305-a may be examples of aspects of one or more of the base stations 105 described with reference to FIG. 1, while a first UE 315, a second UE 315-a, a third UE 315-b, and a fourth UE 315-c may be examples of aspects of one or more of the UEs 115 described with reference to FIG. 1.

In the example of a supplemental downlink mode in the wireless communication system 300, the first base station 305 may transmit OFDMA waveforms to the first UE 315 using a downlink channel 320. The downlink channel 320 may be associated with a frequency F1 in an unlicensed radio frequency spectrum band. The first base station 305 may transmit OFDMA waveforms to the first UE 315 using a first bidirectional link 325 and may receive SC-FDMA waveforms from the first UE 315 using the first bidirectional link 325. The first bidirectional link 325 may be associated with a frequency F4 in a licensed radio frequency spectrum band. The downlink channel 320 in the unlicensed radio frequency spectrum band and the first bidirectional link 325 in the licensed radio frequency spectrum band may operate concurrently. The downlink channel 320 may provide a downlink capacity offload for the first base station 305. In some examples, the downlink channel 320 may be used for unicast services (e.g., addressed to one UE) or for multicast services (e.g., addressed to several UEs). This scenario may occur with any service provider (e.g., an MNO) that uses a licensed radio frequency spectrum band and needs to relieve some of the traffic and/or signaling congestion.

In one example of a carrier aggregation mode in the wireless communication system 300, the first base station 305 may transmit OFDMA waveforms to the second UE 315-a using a second bidirectional link 330 and may receive OFDMA waveforms, SC-FDMA waveforms, and/or resource block interleaved FDMA waveforms from the second UE 315-a using the second bidirectional link 330. The second bidirectional link 330 may be associated with the frequency F1 in the unlicensed radio frequency spectrum band. The first base station 305 may also transmit OFDMA waveforms to the second UE 315-a using a third bidirectional link 335 and may receive SC-FDMA waveforms from the second UE 315-a using the third bidirectional link 335. The third bidirectional link 335 may be associated with a frequency F2 in a licensed radio frequency spectrum band. The second bidirectional link 330 may provide a downlink and uplink capacity offload for the first base station 305. Like the supplemental downlink described above, this scenario may occur with any service provider (e.g., MNO) that uses a licensed radio frequency spectrum and needs to relieve some of the traffic and/or signaling congestion.

In another example of a carrier aggregation mode in the wireless communication system 300, the first base station 305 may transmit OFDMA waveforms to the third UE 315-b using a fourth bidirectional link 340 and may receive OFDMA waveforms, SC-FDMA waveforms, and/or resource block interleaved waveforms from the third UE 315-b using the fourth bidirectional link 340. The fourth bidirectional link 340 may be associated with a frequency F3 in the unlicensed radio frequency spectrum band. The first base station 305 may also transmit OFDMA waveforms to the third UE 315-b using a fifth bidirectional link 345 and may receive SC-FDMA waveforms from the third UE 315-b using the fifth bidirectional link 345. The fifth bidirectional link 345 may be associated with the frequency F2 in the licensed radio frequency spectrum band. The fourth bidirectional link 340 may provide a downlink and uplink capacity offload for the first base station 305. This example and those provided above are presented for illustrative purposes and there may be other similar modes of operation or deployment scenarios that combine LTE/LTE-A in a licensed radio frequency spectrum band and an unlicensed radio frequency spectrum band for capacity offload.

As described above, one type of service provider that may benefit from the capacity offload offered by using LTE/LTE-A in an unlicensed radio frequency spectrum band is a traditional MNO having access rights to an LTE/LTE-A licensed radio frequency spectrum band. For these service providers, an operational example may include a bootstrapped mode (e.g., supplemental downlink, carrier aggregation) that uses the LTE/LTE-A primary component carrier (PCC) on the licensed radio frequency spectrum band and at least one secondary component carrier (SCC) on the unlicensed radio frequency spectrum band.

In the carrier aggregation mode, data and control may, for example, be communicated in the licensed radio frequency spectrum band (e.g., via first bidirectional link 325, third bidirectional link 335, and fifth bidirectional link 345) while data may, for example, be communicated in the unlicensed radio frequency spectrum band (e.g., via second bidirectional link 330 and fourth bidirectional link 340). The carrier aggregation mechanisms supported when using an unlicensed radio frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 300, the second base station 305-a may transmit OFDMA waveforms to the fourth UE 315-c using a bidirectional link 350 and may receive OFDMA waveforms, SC-FDMA waveforms, and/or resource block interleaved FDMA waveforms from the fourth UE 315-c using the bidirectional link 350. The bidirectional link 350 may be associated with the frequency F3 in an unlicensed radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed radio frequency spectrum band.

In some examples, a transmitting apparatus such as one of the base stations 105 and/or 305 described with reference to FIG. 1 and/or 3, and/or one of the UEs 115 and/or 315 described with reference to FIG. 1 and/or 3, may use a gating interval to gain access to a channel of an unlicensed radio frequency spectrum band (e.g., to a physical channel of the unlicensed radio frequency spectrum band). The gating interval may define the application of a contention-based protocol, such as an LBT protocol based on the LBT protocol specified in ETSI (EN 301 893). When using a gating interval that defines the application of an LBT protocol, the gating interval may indicate when a transmitting apparatus needs to perform a CCA. The outcome of the CCA may indicate to the transmitting device whether a channel of an unlicensed radio frequency spectrum band is available or in use for the gating interval (also referred to as an LBT frame, a CCA frame, or simply a frame). When a CCA indicates that the channel is available (e.g., "clear" for use) for a corresponding LBT frame, the transmitting apparatus may reserve and/or use the channel of the unlicensed radio frequency spectrum band during part or all of the LBT frame. When the CCA indicates that the channel is not available (e.g., that the channel is in use or reserved by another apparatus), the transmitting apparatus may be prevented from using the channel during the LBT frame.

In some cases, it may be useful for a transmitting apparatus to generate a gating interval on a periodic basis and synchronize at least one boundary of the gating interval with at least one boundary of a periodic frame structure. For example, it may be useful to generate a periodic gating interval for a cellular downlink in an unlicensed radio frequency spectrum band, and to synchronize at least one boundary of the periodic gating interval with at least one boundary of a periodic frame structure (e.g., a periodic LTE/LTE-A radio frame structure) associated with the cellular downlink. Examples of such synchronization are shown in FIG. 4.

Figure 4:
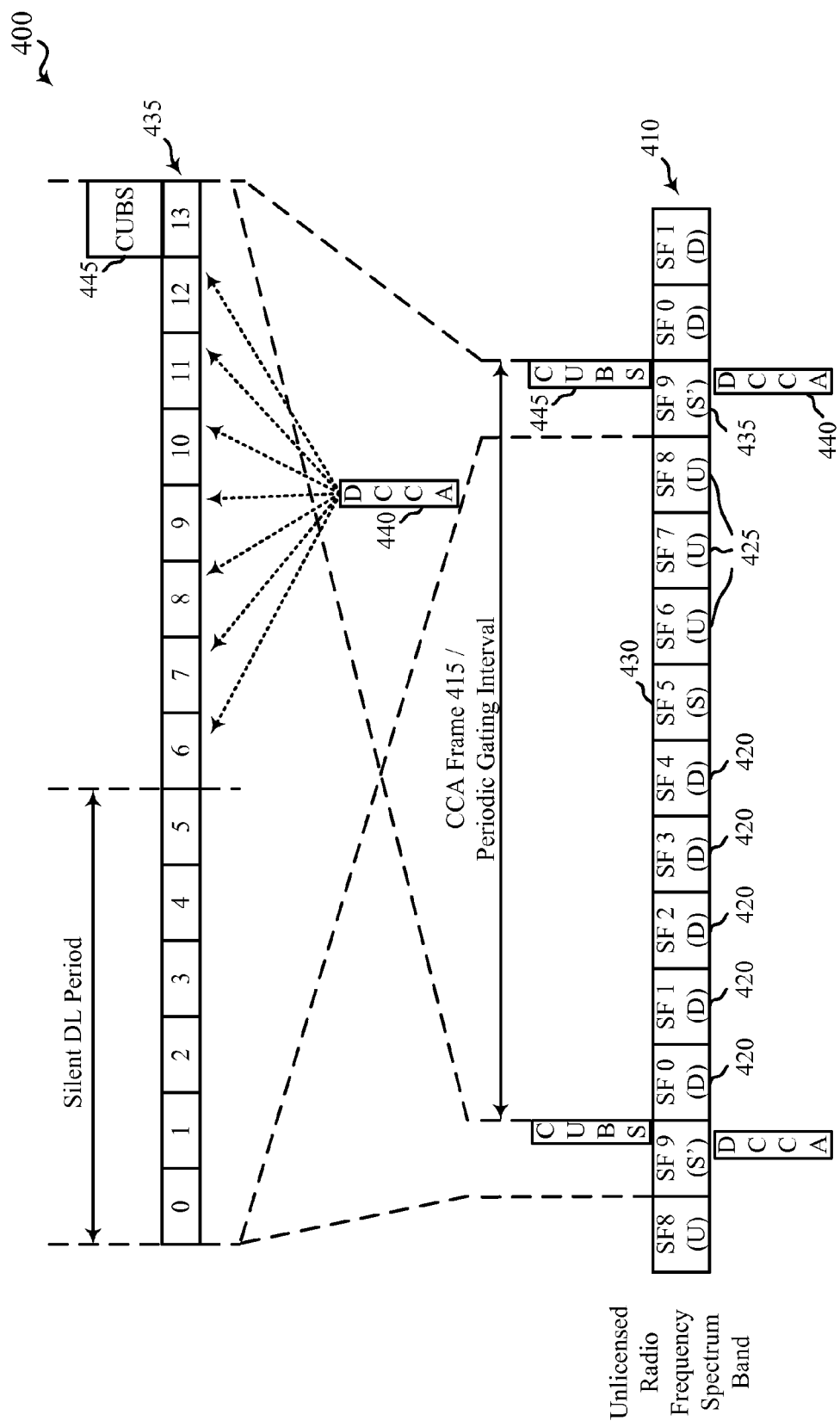
FIG. 4 shows an example of a wireless communication over an unlicensed radio frequency spectrum band, in accordance with various aspects of the present disclosure.

FIG. 4 shows an example 400 of a wireless communication 410 over an unlicensed radio frequency spectrum band, in accordance with various aspects of the present disclosure. By way of example, a CCA frame 415, which may correspond to a periodic gating interval, may have a duration of 10 milliseconds and include a number of downlink subframes 420, a number of uplink subframes 425, and two types of special subframes, an S subframe 430 and an S' subframe 435. The S subframe 430 may provide a transition between downlink subframes 420 and uplink subframes 425, while the S' subframe 435 may provide a transition between uplink subframes 425 and downlink subframes 420. During the S' subframe 435, a downlink clear channel assessment (DCCA) 440 may be performed by one or more base stations, such as one or more of the base stations 105 and/or 305 described with reference to FIG. 1 and/or 3, to contend for access to an unlicensed radio frequency spectrum band, for a period of time, the channel over which the wireless communication 410 occurs. Following a successful DCCA 440 by a base station, a base station may transmit a signal (e.g., a channel usage beacon signal (CUBS) 445) to provide an indication to other base stations and/or apparatuses that the base station has reserved the channel.

The S' subframe 435 may include 14 OFDM symbols, numbered 0 through 13 in FIG. 4. A first portion of the S' subframe 435, symbols 0 through 5 in this example, may be used by base stations as a silent DL period, which may be required for compatibility with LTE/LTE-A communication standards. Thus, a base station may not transmit data during the silent DL period, although a UE may transmit some amount of uplink data during the silent DL period. A second portion of the S' subframe 435 may be used for a DCCA 440. In the example 400, the S' subframe 435 includes seven DCCA slots, included in symbols 6 through 12. Use of the DCCA slots by different network operators may be coordinated to provide more efficient system operation. In some examples, in order to determine which of the seven possible DCCA slots to use to perform a DCCA procedure, a base station 105 may evaluate a mapping-function of the form:

$$F_D(\text{GroupID}, t) \in \{1,2,3,4,5,6,7\}$$

where GroupID is a "deployment group-id" assigned to the base station 105, and t is the LBT frame number corresponding to a gating interval or frame for which DCCA is performed.

The CCA frame 415 described with reference to FIG. 4 is configured as a time division duplexing (TDD) frame having both downlink subframes and uplink subframes. The techniques described herein may be employed with any number of variations of TDD frame (e.g., TDD frames having different numbers and/or arrangements of downlink subframes and uplink subframes), as well as downlink-only frame configurations.

Figure 5:
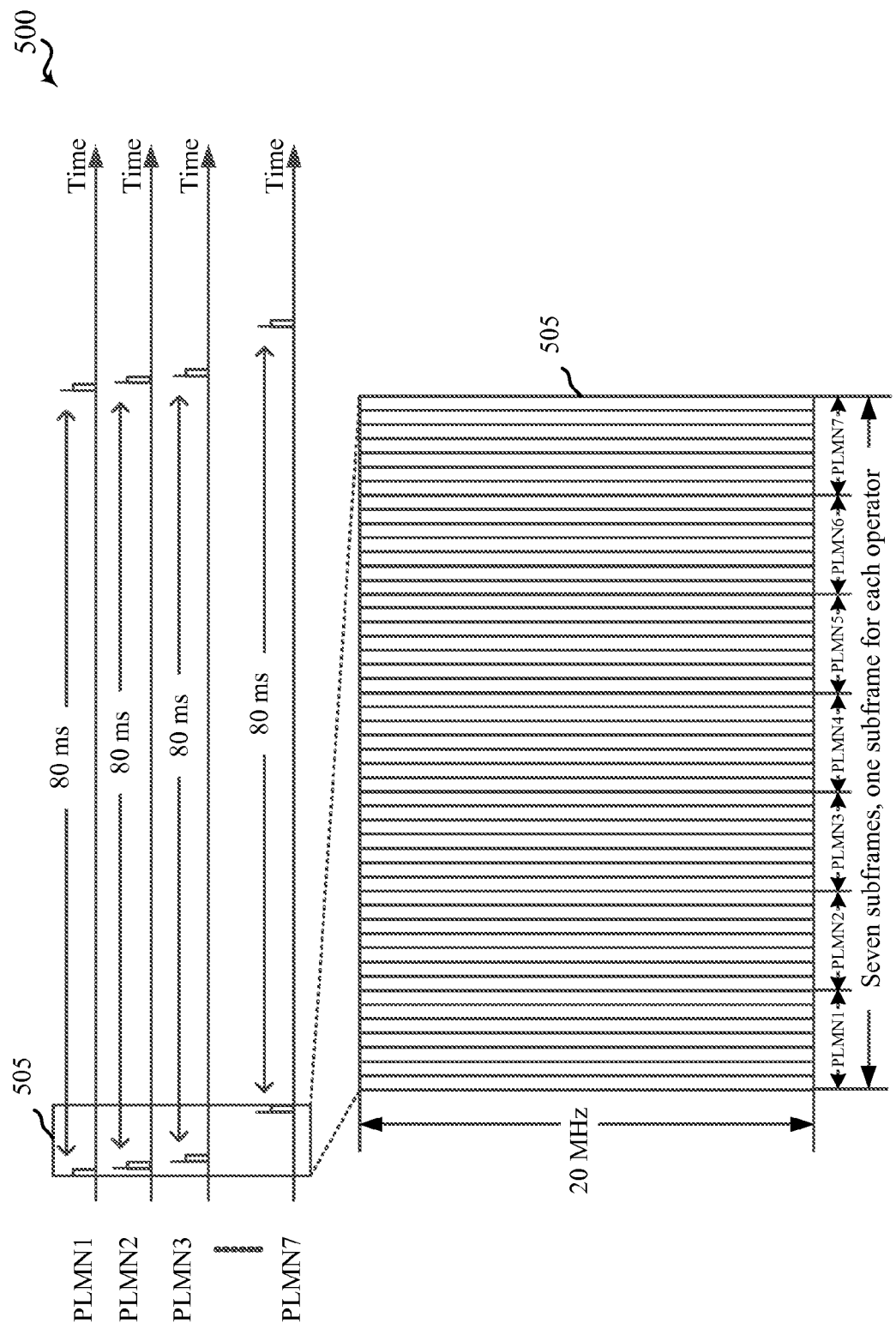
FIG. 5 shows an example of CCA Exempt Transmissions (CETs), in accordance with various aspects of the present disclosure.

FIG. 5 shows an example 500 of CCA Exempt Transmissions (CETs) 505, in accordance with various aspects of the present disclosure. As shown, an allocation of resources for CETs may be made, for example, once every eighty milliseconds (80 ms) or once every CET period, where the CET period may have a configurable periodicity. Each of a number of operators in the unlicensed radio frequency spectrum band (e.g., different PLMNs) may be provided a separate subframe (shown) or subframes (not shown) for transmitting CETs. By way of example, FIG. 5 shows adjacent CET subframes for seven different operators (e.g., operators PLMN1, PLMN2, . . . , PLMN7). Such a structure may be applicable to both downlink and uplink subframes.

Figure 6:
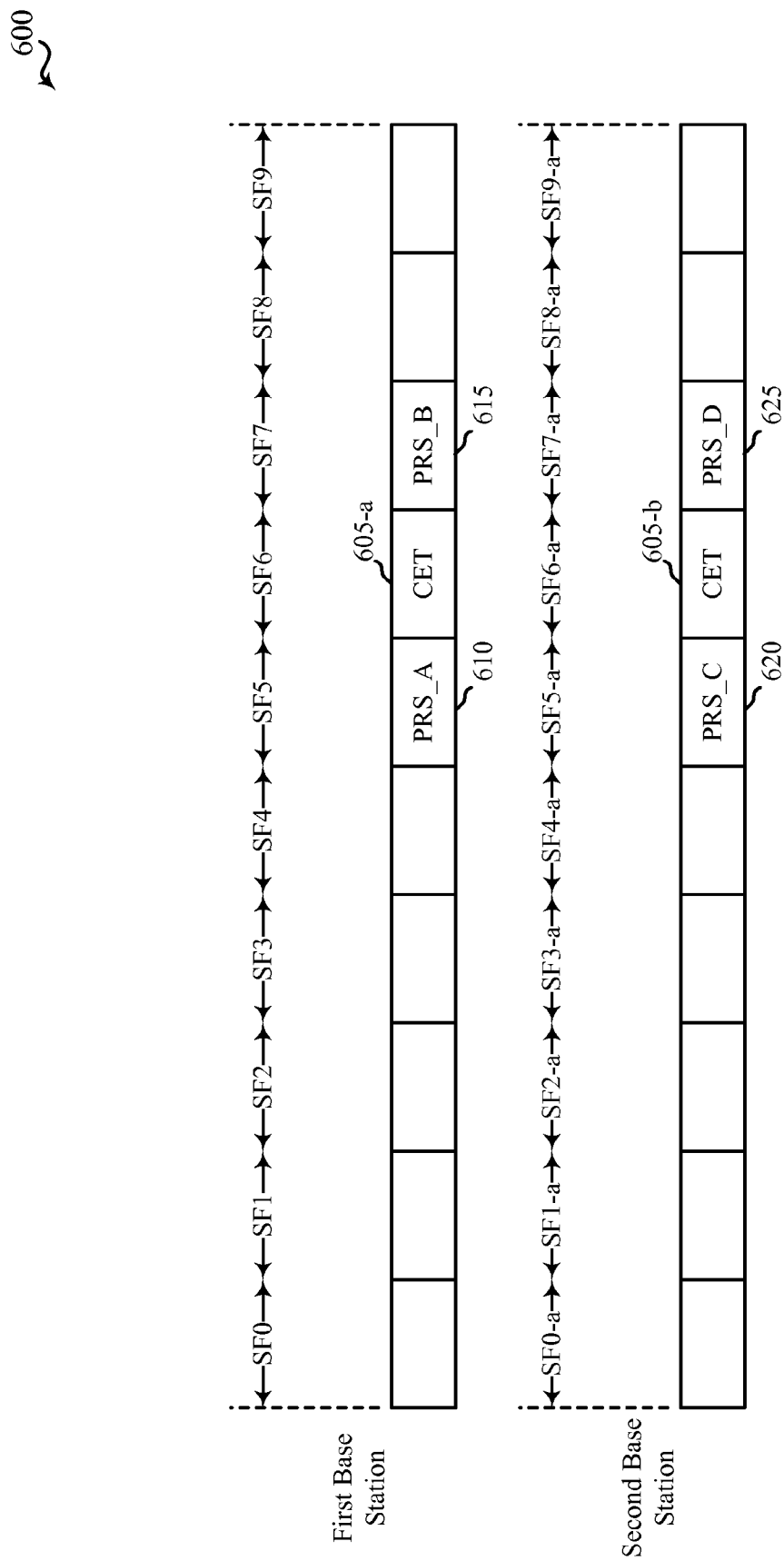
FIG. 6 shows an example of how a PRS may be configured for transmission adjacent a CET, in accordance with various aspects of the present disclosure.

FIG. 6 shows an example 600 of how a PRS may be configured for transmission adjacent a CET 605, in accordance with various aspects of the present disclosure. More particularly, FIG. 6 shows a sequence of subframes (e.g., subframe SF0 to subframe SF9) transmitted by a first base station and a sequence of subframes (e.g., subframe SF0-*a* to subframe SF9-*a*) transmitted by a second base station.

The first base station and the second base station may in some examples be synchronized with respect to transmission of a CET 605 (e.g., a CET 605-*a* of the first base station may be synchronized with a CET 605-*b* of the second base station). The first base station may transmit a PRS adjacent the CET 605-*a*. In one example, a PRS may be transmitted before the CET 605-*a* as PRS_A 610, transmitted in subframe SF5. In another example, a PRS may be transmitted after the CET 605-*a* as PRS_B 615, transmitted in subframe SF7. In other examples, one or more PRS may be transmitted before and after the CET 605-*a* as PRS_A 610, transmitted in subframe SF5, and as PRS_B 615, transmitted in subframe SF7. Similarly, the second base station may transmit a PRS adjacent the CET 605-*b*. In one example, a PRS may be transmitted before the CET 605-*b* as PRS_C 620, transmitted in subframe SF5-*a*. In another example, a PRS may be transmitted after the CET 605-*b* as PRS_D 625, transmitted in subframe SF7-*a*. In other examples, one or more PRS may be transmitted before and after the CET 605-*b* as PRS_C 620, transmitted in subframe SF5-*a*, and as PRS_D 625, transmitted in subframe SF7-*a*.

In an example, the first base station and the second base station may be configured to transmit PRS at a same time and/or a same location (e.g., relative to the CETs 605-*a* and 605-*b*). In a first mode of operation, the first base station may transmit a PRS as PRS_A 610 and the second base station may transmit a PRS as PRS_C 620, thereby time synchronizing and/or location synchronizing (e.g., before the CETs 605-*a* and 605-*b*) the PRS transmissions of the first base station and the second base station. In a second mode of operation, the first base station may transmit a PRS as PRS_B 615 and the second base station may transmit a PRS as PRS_D 625, thereby time synchronizing and/or location synchronizing (e.g., after the CETs 605-*a* and 605-*b*) the PRS transmissions of the first base station and the second base station. In another example, the first base station and the second base station may be configured to transmit PRS at different times and/or different locations (e.g., relative to the CETs 605-*a* and 605-*b*). In a third mode of operation, the first base station may transmit a PRS as PRS_A 610 and the second base station may transmit a PRS as PRS_D 625, thereby varying times and/or varying locations of the PRS transmissions of the first base station and the second base station. In a fourth mode of operation, the first base station may transmit a PRS as PRS_B 615 and the second base station may transmit a PRS as PRS_C 620, thereby varying times and/or varying locations of the PRS transmissions of the first base station and the second base station. In the third and fourth modes of operation, the PRS transmissions of the first base station and the second base station are offset by a known offset (e.g., the length of the CET 605). In other modes of operation, the PRS transmission of the first base station and/or the second base station may be transmitted in more than one subframe (e.g., in one to K subframes). In all of the modes of operation described in this paragraph, a PRS may be transmitted adjacent a CET. Transmitting a PRS contiguous with a CET may ensure that the PRS transmission is able to leverage the CCA exemption of the CET, particularly when the combined duration of the PRS and the CET do not exceed a maximum duration of the CET (e.g., five percent of the transmission time every fifty milliseconds).

The first base station and/or the second base station may be configured to transmit at a same or different periodicities. In some examples, a first periodicity of a PRS transmission by the first base station may be the same as a second periodicity of a PRS transmission by the second base station. When the first periodicity of the PRS transmission by the first base station is the same as the second periodicity of the PRS transmission by the second base station, the first base station and the second base station may be configured to transmit their respective PRS transmissions with a periodicity that is a multiple, J, of a CET transmission periodicity. When J=1, the periodicity at which the first base station and the second base station transmit their respective PRS transmissions may be the same as the CET transmission periodicity. When J>1, the periodicity at which the first base station and the second base station transmit their respective PRS transmissions may differ from the CET transmission periodicity. In some examples, J may be an integer from one to sixteen. In some examples, J may be configurable (e.g., changed) over time. When the first periodicity of the PRS transmission by the first base station is the same as the second periodicity of the PRS transmission by the second base station, and when J>1, the first base station and the second base station may be configured to transmit their respective PRS transmissions at a same or different phase. Thus, in one example, a first phase of the PRS transmission by the first base station may be the same as (e.g., time-synchronized with) a second phase of the PRS transmission by the second base station. In another example, the first phase of the PRS transmission by the first base station may be different (e.g., offset) from the second phase of the PRS transmission by the second base station. When the first base station and the second base station are configured to use different values of J, the first periodicity of the PRS transmission by the first base station may differ from the second periodicity of the PRS transmission by the second base station.

Figure 7:
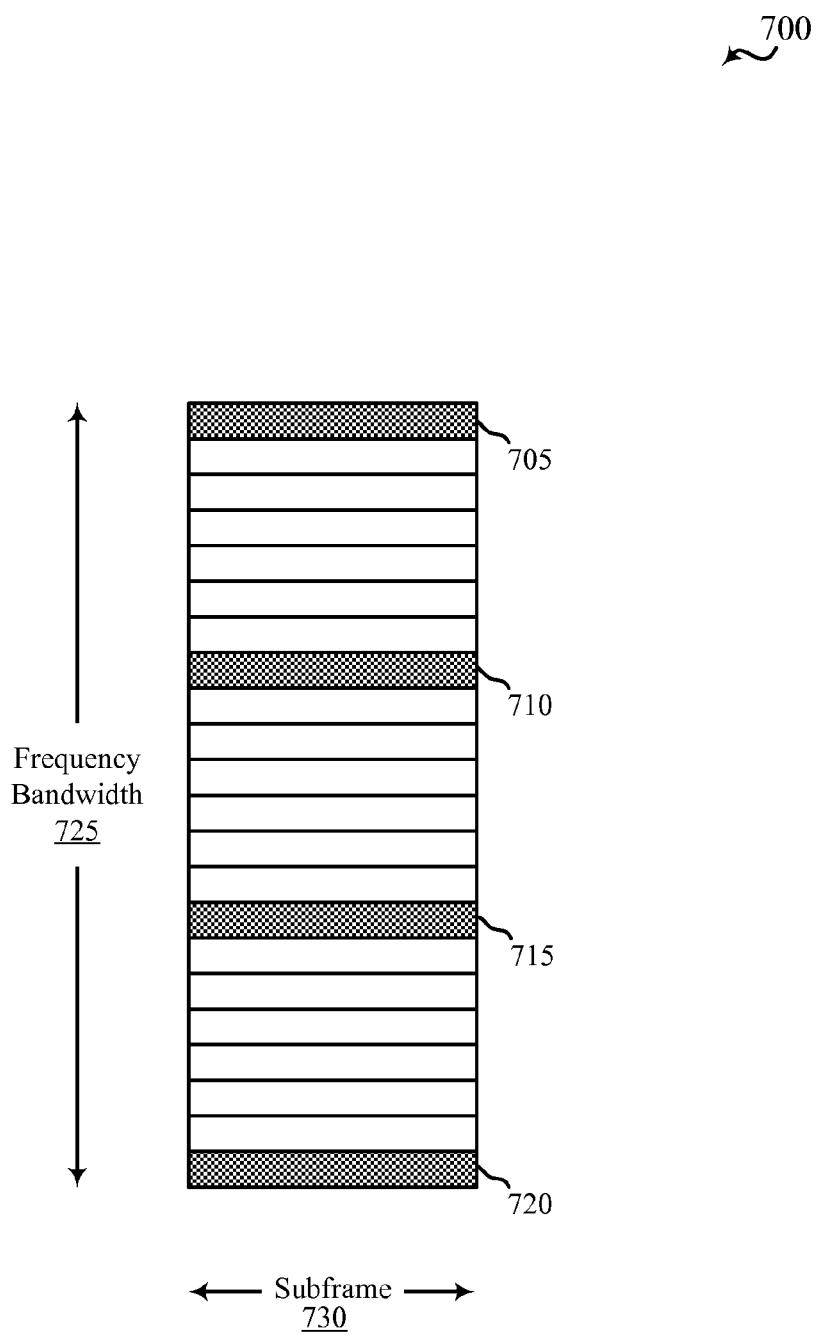
FIG. 7 shows an example of how a PRS may be transmitted using a plurality of interleaved resource blocks, such as a first resource block, a second resource block, a third resource block, and a fourth resource block, in accordance with various aspects of the present disclosure.

Turning now to the transmission of a PRS in an unlicensed radio frequency spectrum band for which there is a requirement that certain communications (e.g., LTE/LTE-A communications in the unlicensed radio frequency spectrum band) occupy at least a certain percentage of the available frequency bandwidth (e.g., at least 80% of the available frequency bandwidth), FIG. 7 shows an example 700 of how a PRS may be transmitted using a plurality of interleaved resource blocks, such as a first resource block 705, a second resource block 710, a third resource block 715, and a fourth resource block 720, in accordance with various aspects of the present disclosure. The first resource block 705, the second resource block 710, the third resource block 715, and the fourth resource block 720 may span at least a certain percentage of the available frequency bandwidth 725 of a subframe 730, so that transmissions using the first resource block 705, the second resource block 710, the third resource block 715, and the fourth resource block 720 occupy at least a required percentage of the frequency bandwidth.

In some examples, a PRS may be transmitted such that the PRS occupies each of the first resource block 705, the second resource block 710, the third resource block 715, and the fourth resource block 720, thereby satisfying the requirement that at least a certain percentage of the available frequency bandwidth be occupied. In other examples, a PRS may be transmitted such that the PRS occupies a portion of the unlicensed radio frequency spectrum band, which portion is less than all of the unlicensed radio frequency spectrum band. In the event that a PRS may occupy a portion (e.g., less than all) of the unlicensed radio frequency spectrum band, other signals may be transmitted with the PRS to satisfy the requirement that at least a certain percentage of the available frequency bandwidth be occupied. For example, the PRS may occupy the second resource block 710 and the third resource block 715, and other downlink signals may be transmitted in the first resource block 705 and the fourth resource block 720, in conjunction with the PRS.

Figure 8:
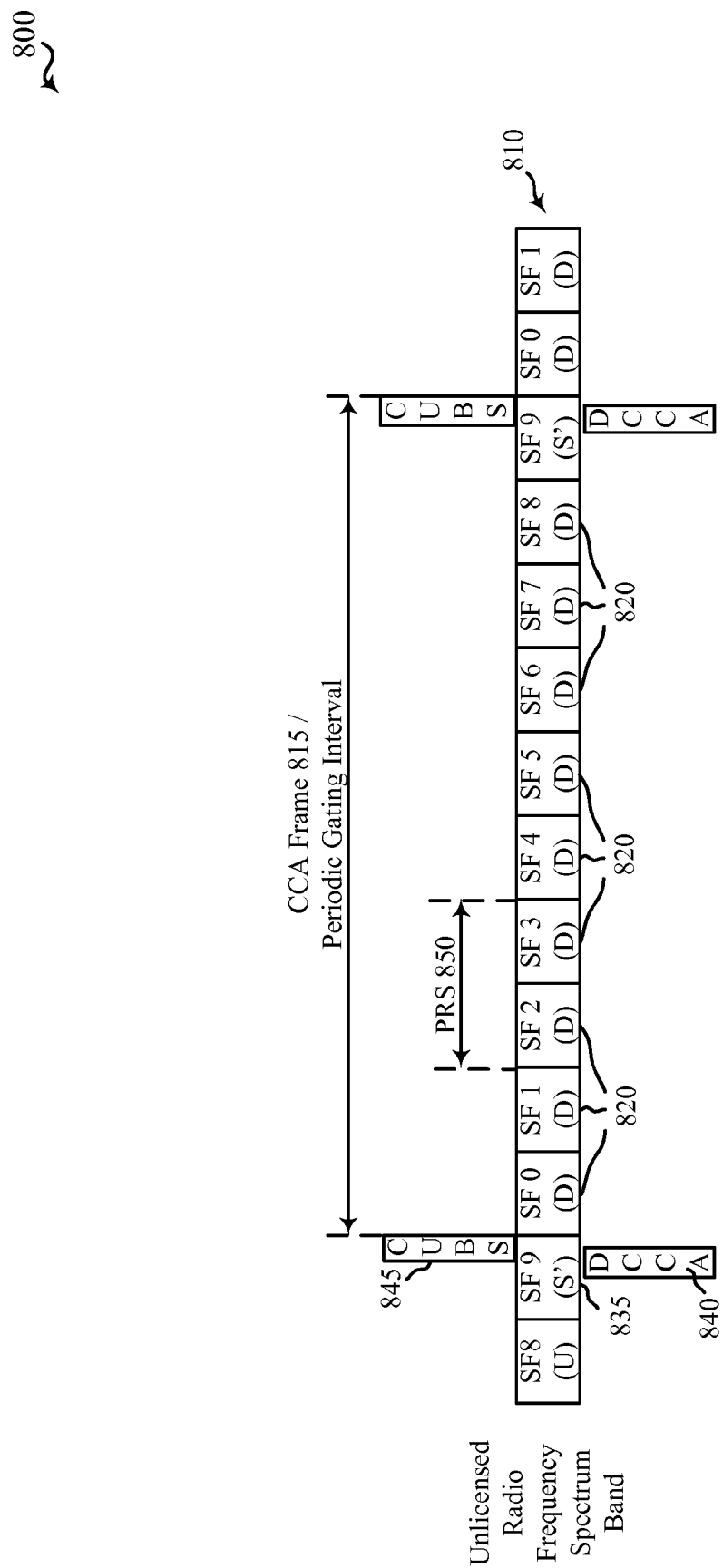
FIG. 8 shows an example of how a PRS may be configured for transmission in at least one downlink (D) subframe of a CCA frame, in accordance with various aspects of the present disclosure.

FIG. 8 shows an example 800 of how a PRS 850 may be configured for transmission in at least one downlink (D) subframe of a CCA frame 815, in accordance with various aspects of the present disclosure. More particularly, FIG. 8 shows a wireless communication 810 over an unlicensed radio frequency spectrum band, in which a CCA frame 815 corresponding to a periodic gating interval may have a duration of 10 milliseconds and include a number of downlink (D) subframes 820 and a special (S') subframe 835. During the S' subframe 835, a downlink clear channel assessment (DCCA) 840 may be performed by one or more base stations, such as one or more of the base stations 105 and/or 305 described with reference to FIG. 1 and/or 3, to reserve, for a period of time, the channel over which the wireless communication 810 occurs. Following a successful DCCA 840 by a base station, a base station may transmit a channel usage beacon signal (CUBS) 845 to provide an indication to other base stations and/or apparatuses that the base station has won contention to access the channel of the unlicensed radio frequency spectrum band.

In some examples, the PRS 850 may be configured for transmission in one or more of the downlink (D) subframes 820, such as, in subframes SF2 and SF3. However, when the DCCA 840 performed by a base station is not successful, the base station may not gain access to the CCA frame 815, and the PRS 850 may not be transmitted. Thus, in the case of DCCA failure, the PRS 850 would not be transmitted, and a receiver (e.g., a UE) would not be able to perform a PRS measurement based at least partly on the PRS 850.

Figure 9:
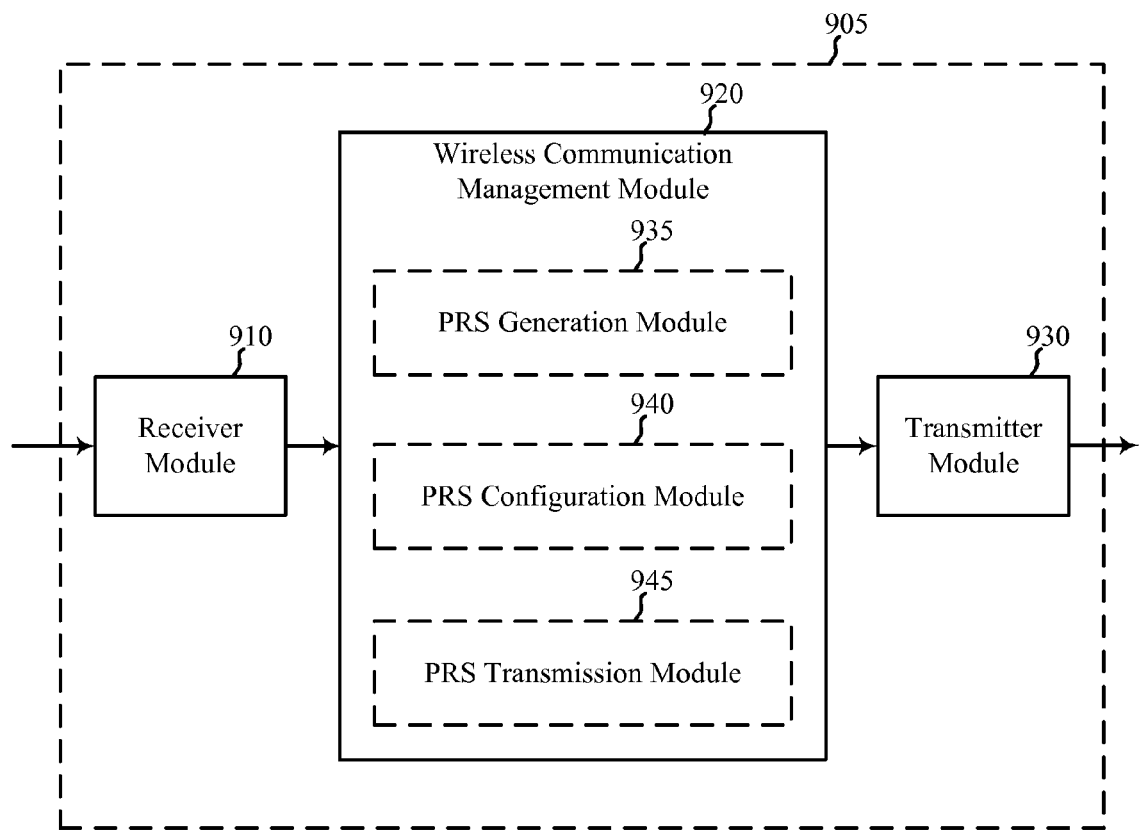
FIG. 9 shows a block diagram of an apparatus for use in wireless communication, in accordance with various aspects of the present disclosure.

FIG. 9 shows a block diagram 900 of an apparatus 905 for use in wireless communication, in accordance with various aspects of the present disclosure. In some examples, the apparatus 905 may be an example of aspects of one or more of the base stations 105, 305, and/or 305-*a* described with reference to FIG. 1 and/or 3. The apparatus 905 may also be a processor. The apparatus 905 may include a receiver module 910, a wireless communication management module 920, and/or a transmitter module 930. Each of these components may be in communication with each other.

The components of the apparatus 905 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 910 may include at least one radio frequency (RF) receiver, such as at least one RF receiver operable to receive transmissions over a licensed radio frequency spectrum band (e.g., a radio frequency spectrum band for which apparatuses do not contend for access because the radio frequency spectrum band is licensed to particular users for particular uses) and/or an unlicensed radio frequency spectrum band (e.g., a radio frequency spectrum band for which apparatuses may need to contend for access because the radio frequency spectrum band is available for unlicensed use, such as Wi-Fi use). In some examples, the licensed radio frequency spectrum band and/or the unlicensed radio frequency spectrum band may be used for LTE/LTE-A communications, as described, for example, with reference to FIG. 1 and/or 3. The receiver module 910 may be used to receive various types of data and/or control signals (i.e., transmissions) over one or more communication links of a wireless communication system, such as one or more communication links of the wireless communication system 100 and/or 300 described with reference to FIG. 1 and/or 3. The communication links may be established over the licensed radio frequency spectrum band and/or the unlicensed radio frequency spectrum band.

In some examples, the transmitter module 930 may include at least one RF transmitter, such as at least one RF transmitter operable to transmit over the licensed radio frequency spectrum band and/or the unlicensed radio frequency spectrum band. The transmitter module 930 may be used to transmit various types of data and/or control signals (i.e., transmissions) over one or more communication links of a wireless communication system, such as one or more communication links of the wireless communication system 100 and/or 300 described with reference to FIG. 1 and/or 3. The communication links may be established over the licensed radio frequency spectrum band and/or the unlicensed radio frequency spectrum band.

In some examples, the wireless communication management module 920 may be used to manage one or more aspects of wireless communication for the apparatus 905. In some examples, the wireless communication management module 920 may include a PRS generation module, a PRS configuration module 940, and/or a PRS transmission module 945.

In some examples, the PRS generation module 935 may be used to generate a PRS. The PRS may in some examples include a number of tones.

In some examples, the PRS configuration module 940 may be used to configure the PRS in at least one downlink subframe among a plurality of downlink subframes.

In some examples, the PRS transmission module 945 may be used to transmit the PRS in the at least one downlink subframe using an unlicensed radio frequency spectrum band.

Figure 10:
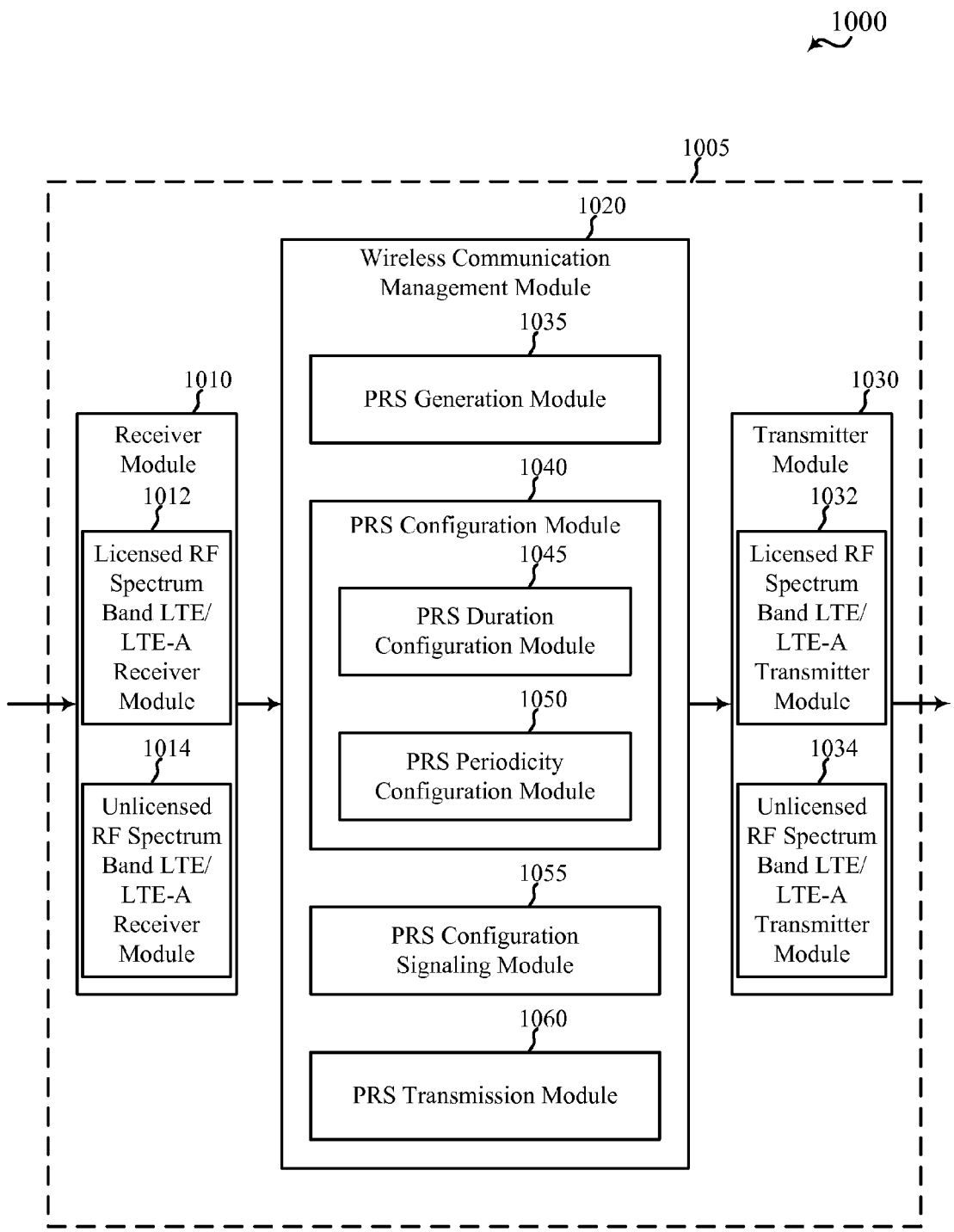
FIG. 10 shows a block diagram of an apparatus for use in wireless communication, in accordance with various aspects of the present disclosure.

FIG. 10 shows a block diagram 1000 of an apparatus 1005 for use in wireless communication, in accordance with various aspects of the present disclosure. In some examples, the apparatus 1005 may be an example of aspects of one or more of the base stations 105, 305, and/or 305-a described with reference to FIG. 1 and/or 3, and/or an example of aspects of the apparatus 905 described with reference to FIG. 9. The apparatus 1005 may also be a processor. The apparatus 1005 may include a receiver module 1010, a wireless communication management module 1020, and/or a transmitter module 1030. Each of these components may be in communication with each other.

The components of the apparatus 1005 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1010 may include at least one RF receiver, such as at least one RF receiver operable to receive transmissions over licensed radio frequency spectrum band (e.g., a radio frequency spectrum band for which apparatuses do not contend for access because the radio frequency spectrum band is licensed to particular users for particular uses) and/or an unlicensed radio frequency spectrum band (e.g., a radio frequency spectrum band for which apparatuses may need to contend for access because the radio frequency spectrum band is available for unlicensed use, such as Wi-Fi use). In some examples, the licensed radio frequency spectrum band and/or the unlicensed radio frequency spectrum band may be used for LTE/LTE-A communications, as described, for example, with reference to FIG. 1 and/or 3. The receiver module 1010 may in some cases include separate receivers for the licensed radio frequency spectrum band and the unlicensed radio frequency spectrum band. The separate receivers may, in some examples, take the form of a licensed RF spectrum band LTE/LTE-A receiver module 1012 for communicating over the licensed radio frequency spectrum band, and an unlicensed RF spectrum band LTE/LTE-A receiver module 1014 for communicating over the unlicensed radio frequency spectrum band. The receiver module 1010, including the licensed RF spectrum band LTE/LTE-A receiver module 1012 and/or the unlicensed RF spectrum band LTE/LTE-A receiver module 1014, may be used to receive various types of data and/or control signals (i.e., transmissions) over one or more communication links of a wireless communication system, such as one or more communication links of the wireless communication system 100 and/or 300 described with reference to FIG. 1 and/or 3. The communication links may be established over the licensed radio frequency spectrum band and/or the unlicensed radio frequency spectrum band.

In some examples, the transmitter module 1030 may include at least one RF transmitter, such as at least one RF transmitter operable to transmit over the licensed radio frequency spectrum band and/or the unlicensed radio frequency spectrum band. The transmitter module 1030 may in some cases include separate transmitters for the licensed radio frequency spectrum band and the unlicensed radio frequency spectrum band. The separate transmitters may, in some examples, take the form of a licensed RF spectrum band LTE/LTE-A transmitter module 1032 for communicating over the licensed radio frequency spectrum band, and an unlicensed RF spectrum band LTE/LTE-A transmitter module 1034 for communicating over the unlicensed radio frequency spectrum band. The transmitter module 1030, including the licensed RF spectrum band LTE/LTE-A transmitter module 1032 and/or the unlicensed RF spectrum band LTE/LTE-A transmitter module 1034, may be used to transmit various types of data and/or control signals (i.e., transmissions) over one or more communication links of a wireless communication system, such as one or more communication links of the wireless communication system 100 and/or 300 described with reference to FIG. 1 and/or 3. The communication links may be established over the licensed radio frequency spectrum band and/or the unlicensed radio frequency spectrum band.

In some examples, the wireless communication management module 1020 may be an example of one or more aspects of the wireless communication management module 920 described with reference to FIG. 9. The wireless communication management module 1020 may include a PRS generation module 1035, a PRS configuration module 1040, a PRS configuration signaling module 1055, and/or a PRS transmission module 1060. Each of these components may be in communication with each other.

In some examples, the PRS generation module 1035 may be used to generate a PRS. The PRS may in some examples include a number of tones.

In some examples, the PRS configuration module 1040 may be an example of the PRS configuration module 940 described with reference to FIG. 9 and may include a PRS duration configuration module 1045 and/or a PRS periodicity configuration module 1050. The PRS configuration module 1040 may be used to configure the PRS in at least one downlink subframe among a plurality of downlink subframes. The configuring may include configuring the PRS to be adjacent a CET. In another example, the configuring may include configuring the PRS to be a portion of a signal (e.g., a portion of a CCA frame).

In some examples, the PRS duration configuration module 1045 may be used to configure a duration of the PRS. In some examples, the PRS may be configured in units of downlink subframes and be configured to have a duration of one to K downlink subframes. In some examples, the PRS duration configuration module 1045 may configure a combined duration of the PRS and the CET to be less than a maximum allowed duration of the CET. In some examples, the maximum allowed duration of the CET may be a percentage of the Transmit On (Tx-ON) during a defined period of time.

In some examples, the PRS periodicity configuration module 1050 may be used to configure a periodicity and/or phase offset for transmitting the PRS adjacent the CET. In some examples, the PRS periodicity configuration module 1050 may configure a first periodicity of transmitting the PRS adjacent the CET to be the same as a second periodicity at which the CET is transmitted (e.g., the PRS may be transmitted every time the CET is transmitted). In other examples, the PRS periodicity configuration module 1050 may configure a first periodicity of transmitting the PRS adjacent the CET to differ from a second periodicity at which the CET is transmitted (e.g., the PRS may not be transmitted every time the CET is transmitted, but may be transmitted every J CETs, where the value of J is configurable). In these latter examples, the PRS periodicity configuration module 1050 may also configure a phase offset for transmitting the PRS adjacent the CET. In some cases, a first phase offset used by a first transmitter (e.g., a first base station) to transmit the PRS adjacent the CET may differ from a second phase offset used by a second transmitter (e.g., a second base station) to transmit the PRS adjacent the CET. The first periodicity may be a variable periodicity and the first phase offset may be a variable phase offset, such that the first transmitter may configure a periodicity and phase offset that are useful to the first transmitter and/or its receivers, and/or configure a periodicity and/or phase offset that are the same or different from a periodicity and/or phase offset used by another transmitter (e.g., the second transmitter). Other configurations of periodicity and/or phase offset that may be made by the PRS periodicity configuration module 1050 are described with reference to FIG. 6.

In some examples, the PRS periodicity configuration module 1050 may also or alternately be used to configure a muting parameter and/or a variable cell-specific frequency shift parameter associated with a PRS transmission.

In some examples, the PRS configuration signaling module 1055 may be used to signal to a receiver (e.g., a UE) various parameters associated with PRS transmissions. For example, the PRS configuration signaling module 1055 may be used to signal to a receiver a timing of transmitting the PRS adjacent the CET (e.g., a timing of transmitting an impending transmission of the PRS adjacent the CET).

In some examples, the PRS transmission module 1060 may be an example of the PRS transmission module 945 described with reference to FIG. 9 and may be used to transmit the PRS adjacent the CET in the at least one downlink subframe using the unlicensed RF spectrum band LTE/LTE-A transmitter module 1034 and the unlicensed radio frequency spectrum band. In some examples, the PRS may be transmitted contiguously with the CET (e.g., with no transmission gaps between at least one downlink subframe in which the PRS is transmitted and at least one downlink subframe in which the CET is transmitted). In some examples, the PRS transmission module 1060 may periodically transmit the PRS adjacent the CET by periodically transmitting the PRS adjacent the CET according to the first periodicity and the first phase offset configured by the PRS periodicity configuration module 1050.

Configuring the PRS to be adjacent a CET may enable the PRS to leverage the CET property of guaranteed transmission over the unlicensed radio frequency spectrum band. In some examples, the PRS transmission module 1060 may transmit the PRS before the CET. In other examples, the PRS transmission module 1060 may transmit the PRS after the CET.

In some examples, PRS transmission module 1060 may be used to transmit the PRS such that the PRS occupies a portion of the unlicensed radio frequency spectrum band, which portion is less than all of the unlicensed radio frequency spectrum band. In these examples, other downlink signals may be transmitted in conjunction with the PRS. The other downlink signals may in some cases be transmitted to meet unlicensed spectrum bandwidth usage requirements, as described with reference to FIG. 7.

In some examples, the PRS transmission module 1060 may transmit the PRS across a plurality of frequencies of the unlicensed radio frequency spectrum band, as may be useful in an inter-frequency and/or carrier aggregation transmission scenario. When the relative PRS transmission timing across the plurality of frequencies may be unknown, the PRS configuration signaling module 1055 may be used to signal, to a receiver (e.g., a UE), a timing offset indicating the relative PRS transmission timing across the plurality of frequencies.

In some examples, a plurality of apparatus 1005 may transmit a PRS. In such examples, various PRS transmission scenarios are possible. In a first example, the transmission of a PRS by the apparatus 1005 may be time synchronized with a transmission of at least a second PRS by at least a second apparatus (e.g., at least two apparatuses may transmit a PRS at the same time, in a same one or more downlink subframes). In a second example, a PRS transmitted by the apparatus 1005 may be transmitted before a CET, while at least a second PRS may be transmitted by a second apparatus after a CET. Alternately, a PRS transmitted by the apparatus 1005 may be transmitted after a CET, while at least a second PRS may be transmitted by a second apparatus before a CET. In either alternative, each PRS may be transmitted adjacent a CET. In a third example, a PRS transmitted by the apparatus 1005 may be transmitted with a same periodicity as, and a different phase offset than, a transmission of at least a second PRS transmitted by at least a second apparatus. In a fourth example, a PRS transmitted by the apparatus 1005 may be transmitted with a different periodicity than a transmission of at least a second PRS transmitted by at least a second apparatus. In a fifth example, a PRS transmitted by the apparatus 1005 may be associated with a muting parameter and/or a variable cell-specific frequency shift parameter, which muting parameter and/or variable cell-specific frequency shift parameter may be the same as, or different from, a muting parameter and/or a variable cell-specific frequency shift parameter associated with a transmission of at least a second PRS by at least a second apparatus. In a sixth example, a PRS may be transmitted by the apparatus 1005 in accordance with a combination of two or more of the preceding examples.

Figure 11:
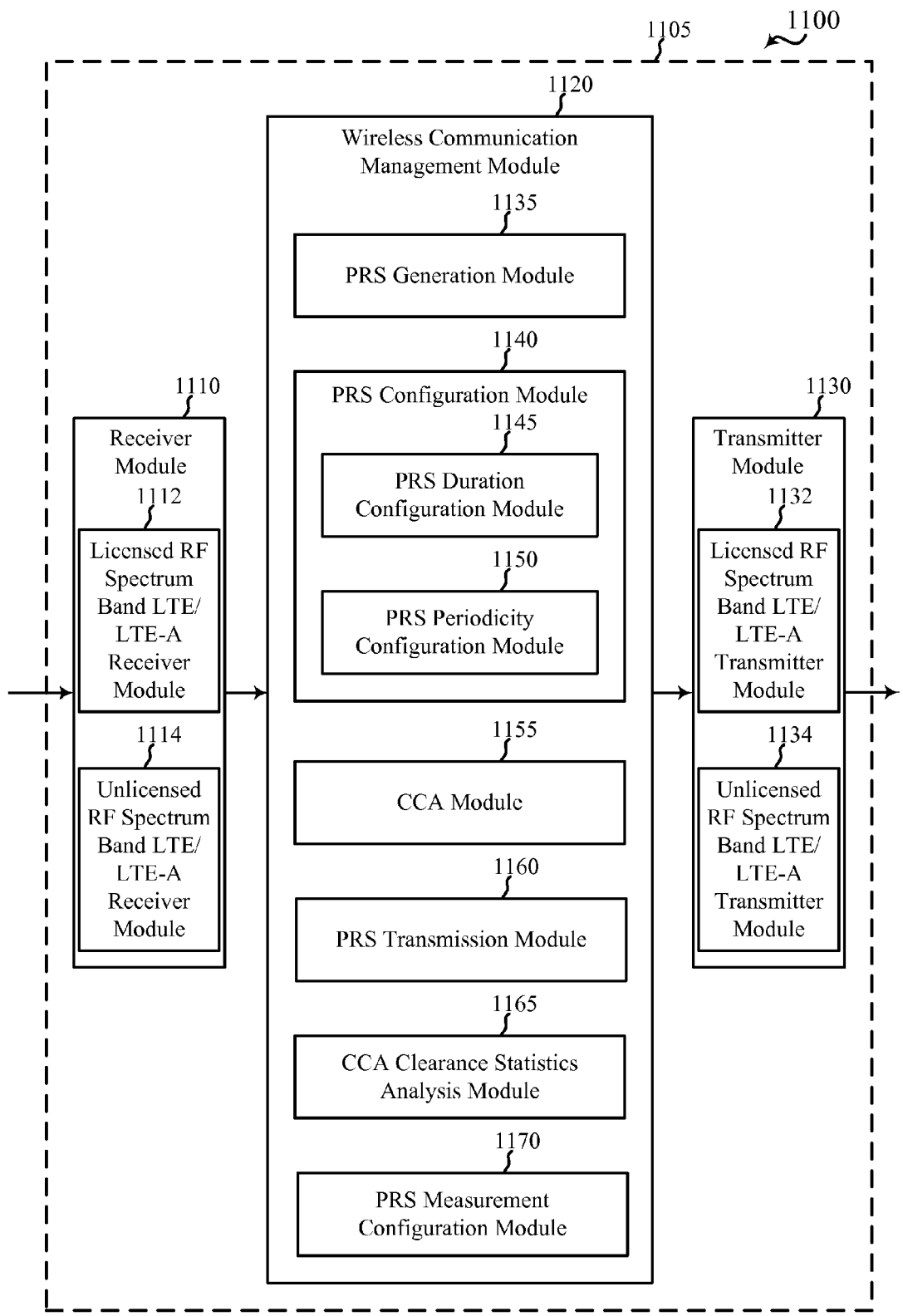
FIG. 11 shows a block diagram of an apparatus for use in wireless communication, in accordance with various aspects of the present disclosure.

FIG. 11 shows a block diagram 1100 of an apparatus 1105 for use in wireless communication, in accordance with various aspects of the present disclosure. In some examples, the apparatus 1105 may be an example of aspects of one or more of the base stations 105, 305, and/or 305-*a* described with reference to FIG. 1 and/or 3, and/or an example of aspects of the apparatus 905 described with reference to FIG. 9. The apparatus 1105 may also be a processor. The apparatus 1105 may include a receiver module 1110, a wireless communication management module 1120, and/or a transmitter module 1130. Each of these components may be in communication with each other.

The components of the apparatus 1105 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1110 may include at least one RF receiver, such as at least one RF receiver operable to receive transmissions over licensed radio frequency spectrum band (e.g., a radio frequency spectrum band for which apparatuses do not contend for access because the radio frequency spectrum band is licensed to particular users for particular uses) and/or an unlicensed radio frequency spectrum band (e.g., a radio frequency spectrum band for which apparatuses may need to contend for access because the radio frequency spectrum band is available for unlicensed use, such as Wi-Fi use). In some examples, the licensed radio frequency spectrum band and/or the unlicensed radio frequency spectrum band may be used for LTE/LTE-A communications, as described, for example, with reference to FIG. 1 and/or 3. The receiver module 1110 may in some cases include separate receivers for the licensed radio frequency spectrum band and the unlicensed radio frequency spectrum band. The separate receivers may, in some examples, take the form of a licensed RF spectrum band LTE/LTE-A receiver module 1112 for communicating over the licensed radio frequency spectrum band, and an unlicensed RF spectrum band LTE/LTE-A receiver module 1114 for communicating over the unlicensed radio frequency spectrum band. The receiver module 1110, including the licensed RF spectrum band LTE/LTE-A receiver module 1112 and/or the unlicensed RF spectrum band LTE/LTE-A receiver module 1114, may be used to receive various types of data and/or control signals (i.e., transmissions) over one or more communication links of a wireless communication system, such as one or more communication links of the wireless communication system 100 and/or 300 described with reference to FIG. 1 and/or 3. The communication links may be established over the licensed radio frequency spectrum band and/or the unlicensed radio frequency spectrum band.

In some examples, the transmitter module 1130 may include at least one RF transmitter, such as at least one RF transmitter operable to transmit over the licensed radio frequency spectrum band and/or the unlicensed radio frequency spectrum band. The transmitter module 1130 may in some cases include separate transmitters for the licensed radio frequency spectrum band and the unlicensed radio frequency spectrum band. The separate transmitters may, in some examples, take the form of a licensed RF spectrum band LTE/LTE-A transmitter module 1132 for communicating over the licensed radio frequency spectrum band, and an unlicensed RF spectrum band LTE/LTE-A transmitter module 1134 for communicating over the unlicensed radio frequency spectrum band. The transmitter module 1130, including the licensed RF spectrum band LTE/LTE-A transmitter module 1132 and/or the unlicensed RF spectrum band LTE/LTE-A transmitter module 1134, may be used to transmit various types of data and/or control signals (i.e., transmissions) over one or more communication links of a wireless communication system, such as one or more communication links of the wireless communication system 100 and/or 300 described with reference to FIG. 1 and/or 3. The communication links may be established over the licensed radio frequency spectrum band and/or the unlicensed radio frequency spectrum band.

In some examples, the wireless communication management module 1120 may be an example of one or more aspects of the wireless communication management module 920 described with reference to FIG. 9. The wireless communication management module 1120 may include a PRS generation module 1135, a PRS configuration module 1140, a CCA module 1155, a PRS transmission module 1160, a CCA clearance statistics analysis module 1165, and/or a PRS measurement configuration module 1170. Each of these components may be in communication with each other.

In some examples, the PRS generation module 1135 may be used to generate a PRS. The PRS may in some examples include a number of tones.

In some examples, the PRS configuration module 1140 may be an example of the PRS configuration module 940 described with reference to FIG. 9 and may include a PRS duration configuration module 1145 and/or a PRS periodicity configuration module 1150. The PRS configuration module 1140 may be used to configure the PRS in at least one downlink subframe among a plurality of downlink subframes of a CCA frame. The PRS configuration module 1140 may also configure PRS configuration parameters such as those that are currently used to configure a PRS in at least one downlink subframe of a licensed radio frequency spectrum band (e.g., duration, periodicity, number of consecutive transmissions defining a measurement period, etc., as described, for example, with reference to FIG. 2A and/or 2B). However, as discussed below, CCA failures may interfere with a strict implementation of some PRS configuration parameters.

In some examples, the PRS duration configuration module 1145 may be used to configure a duration of the PRS. In some examples, the PRS may be configured in units of downlink subframes and be configured to have a duration of one to K downlink subframes.

In some examples, the PRS periodicity configuration module 1150 may be used to configure a periodicity and/or phase offset for transmitting the PRS. In some cases, the PRS periodicity configuration module 1150 may be used to configure a first phase offset used by the apparatus 1105 to transmit the PRS, which first phase offset may differ from a second phase offset used by a second apparatus (e.g., a second base station) to transmit the PRS. The first periodicity may be a variable periodicity and the first phase offset may be a variable phase offset, such that the first transmitter may configure a periodicity and phase offset that are useful to the first transmitter and/or its receivers, and/or configure a periodicity and/or phase offset that are the same or different from a periodicity and/or phase offset used by another transmitter (e.g., the second transmitter).

In some examples, the CCA module 1155 may be used to perform a CCA procedure to contend for access to an unlicensed radio frequency spectrum band (e.g., a radio frequency spectrum band for which apparatuses may need to contend for access because the radio frequency spectrum band is available for unlicensed use, such as Wi-Fi use) for a period of time (e.g., a frame).

In some examples, the PRS transmission module 1160 may be an example of the PRS transmission module 945 described with reference to FIG. 9 and may be used to transmit the PRS in at least one downlink subframe of a frame for which a CCA was successfully performed by the CCA module 1155. However, for a frame of the unlicensed radio frequency spectrum band for which a CCA procedure performed by the CCA module 1155 failed, the PRS transmission module 1160 may gate off a transmission of the PRS.

In some examples, the PRS transmission module 1160 may be used to transmit the PRS such that the PRS occupies a portion of the unlicensed radio frequency spectrum band, which portion is less than all of the unlicensed radio frequency spectrum band. In these examples, other downlink signals may be transmitted in conjunction with the PRS. The other downlink signals may in some cases be transmitted to meet unlicensed spectrum bandwidth usage requirements, as described with reference to FIG. 7.

In some examples, the PRS transmission module 1160 may be used to transmit the PRS across a plurality of frequencies of the unlicensed radio frequency spectrum band, as may be useful in an inter-frequency and/or carrier aggregation transmission scenario. When the relative PRS transmission timing across the plurality of frequencies may be unknown, the wireless communication management module 1120 may be used to signal, to a receiver (e.g., a UE), a timing offset indicating the relative PRS transmission timing across the plurality of frequencies.

In some examples, the CCA clearance statistics analysis module 1165 may be used to receive at least one CCA clearance statistic related to at least one PRS measurement. The at least one CCA clearance statistic may be received, in some examples, from at least one receiver (e.g., at least one UE) and/or at least one transmitter (e.g., at least one base station and/or eNB).

In some examples, a receiver of PRS transmissions may perform a number of suitable PRS measurements (e.g., M/2 suitable measurements) within a measurement period before its PRS measurements are deemed useful. This suitable PRS measurement requirement may be met by a receiver performing PRS measurements on the PRS transmissions of one or more transmitters (e.g., one or more base stations and/or eNBs). However, when one or more transmitters fail one or more CCA procedures for frames in which PRS transmissions are to be transmitted, the PRS transmissions are not transmitted and, therefore, a receiver (e.g., a UE) cannot make a suitable PRS measurement for that frame. There may also be instances in which signal interference renders a PRS transmission unusable for measurement purposes. As a result, a PRS transmission in a frame for which a CCA procedure needs to be performed increases the likelihood that a receiver will fail the M/2 suitable PRS measurements requirement. To increase the probability that a receiver will pass the M/2 suitable PRS measurements requirement, a receiver may identify frames for which a CCA procedure failed and determine CCA clearance statistics for reporting back to the network (e.g., to a serving cell of a base station and/or eNB). The CCA clearance statistics may be reported, for example, via RSTD measurement results and/or error reporting results. Transmitters (e.g., base stations and/or eNBs) may also identify frames for which a CCA procedure failed and determine CCA clearance statistics for reporting to other transmitters. Any or all of these CCA clearance statistics may be analyzed, in some examples, by the CCA clearance statistics analysis module 1165.

In some examples, the PRS measurement configuration module 1170 may be used to determine whether an attempt to transmit at least M PRS signals during a measurement period has been made. If not, the PRS measurement configuration module 1170 may cause the CCA module 1155 to perform a CCA procedure for a next frame of the unlicensed radio frequency spectrum band in which a PRS is to be transmitted. An attempt to transmit a PRS may in some cases correspond to performing a CCA procedure for a frame of the unlicensed radio frequency spectrum band in which a PRS is to be transmitted (regardless of whether the CCA procedure fails).

In some examples, the PRS measurement configuration module 1170 may be used to determine whether at least one additional PRS measurement is needed, based at least in part on at least one CCA clearance statistic related to at least one PRS measurement. The PRS measurement configuration module 1170 may also be used, when needed, to configure transmissions of a PRS based at least in part on the at least one CCA clearance statistic related to the at least one PRS measurement (e.g., to increase a number of PRS transmissions within a measurement period), and/or to configure the at least one additional PRS measurement based at least in part on the at least one CCA clearance statistic related to the at least one PRS measurement.

Various parameters may be configured based at least in part on the at least one CCA clearance statistic. In some examples, the number of PRS transmissions may be increased while maintaining, for example, an M/2 suitable measurements requirement for PRS measurements to be deemed useful. In these examples, the greater number of PRS transmissions may increase the likelihood that a receiver will be able to meet the M/2 suitable measurements requirement. Changes in other configuration parameters (e.g., PRS duration) may also be made to increase the likelihood that a receiver will be able to meet the M/2 suitable measurements requirement.

After the PRS measurement configuration module 1170 changes one or more configuration parameters associated with PRS transmissions, a receiver may be requested (e.g., via the apparatus 1105) to redo its PRS measurements and/or make additional PRS measurements. In the latter case, and by way of example, the PRS measurement configuration module 1170 may schedule additional PRS measurements for a receiver, but indicate to the receiver that prior PRS measurements may be used (or are to be used) in a cumulative manner in formulating an RSTD result.

Figure 12:
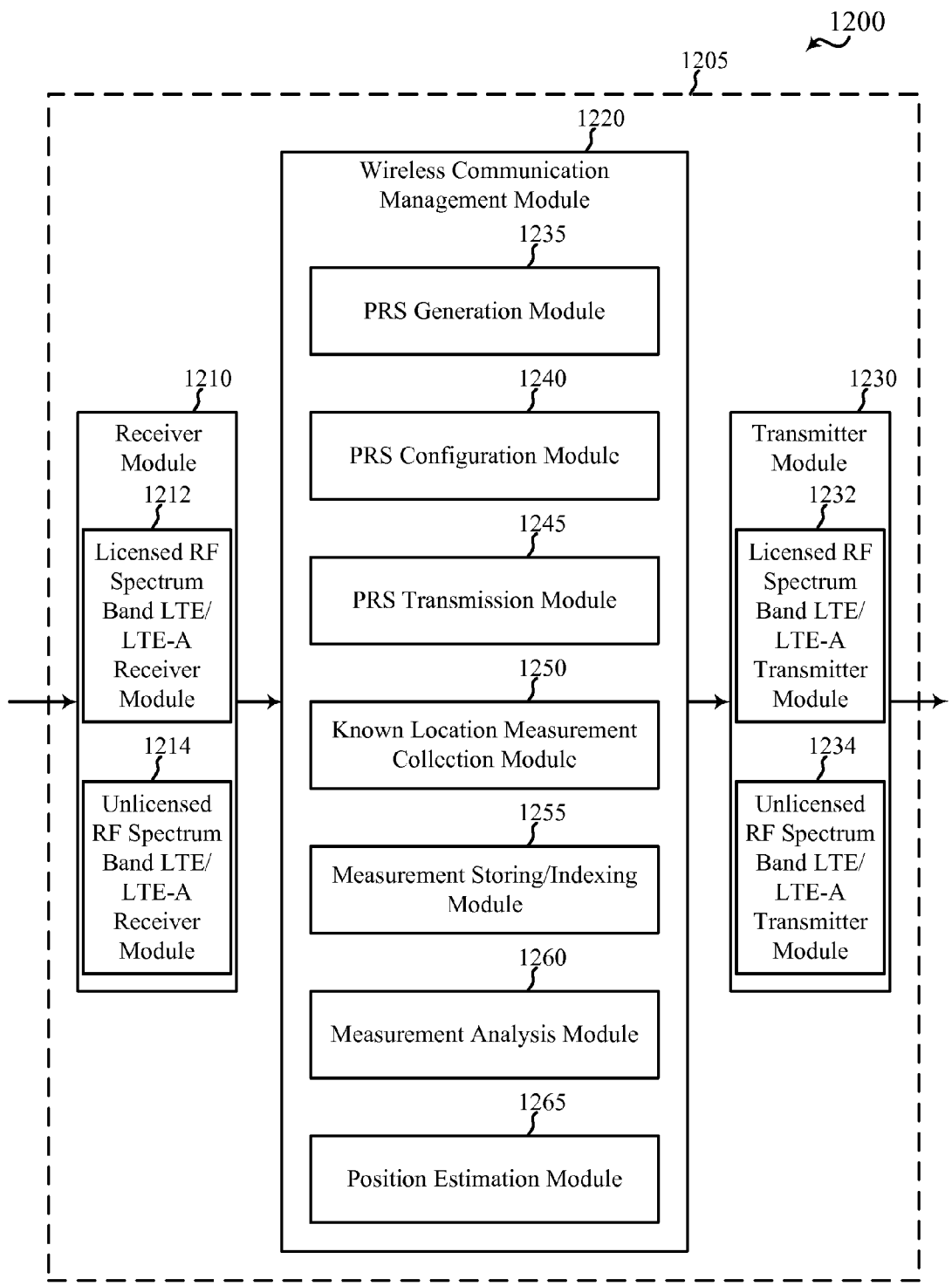
FIG. 12 shows a block diagram of an apparatus for use in wireless communication, in accordance with various aspects of the present disclosure.

FIG. 12 shows a block diagram 1200 of an apparatus 1205 for use in wireless communication, in accordance with various aspects of the present disclosure. In some examples, the apparatus 1205 may be an example of aspects of one or more of the base stations 105, 305, and/or 305-*a* described with reference to FIG. 1 and/or 3, and/or an example of aspects of the apparatus 905 described with reference to FIG. 9. The apparatus 1205 may also be a processor. The apparatus 1205 may include a receiver module 1210, a wireless communication management module 1220, and/or a transmitter module 1230. Each of these components may be in communication with each other.

In environments where the locations of PRS transmitters are not known, PRS measurements may not be usable to determine the position of a receiver by conventional triangulation. The apparatus 1205 may be used to determine the position of a receiver in such environments. The apparatus 1205 may be useful in environments in which a receiver operates in a standalone mode with respect to an unlicensed radio frequency spectrum band (e.g., a radio frequency spectrum band for which apparatuses may need to contend for access because the radio frequency spectrum band is available for unlicensed use, such as Wi-Fi use).

The components of the apparatus 1205 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1210 may include at least one RF receiver, such as at least one RF receiver operable to receive transmissions over licensed radio frequency spectrum band (e.g., a radio frequency spectrum band for which apparatuses do not contend for access because the radio frequency spectrum band is licensed to particular users for particular uses) and/or an unlicensed radio frequency spectrum band. In some examples, the licensed radio frequency spectrum band and/or the unlicensed radio frequency spectrum band may be used for LTE/LTE-A communications, as described, for example, with reference to FIG. 1 and/or 3. The receiver module 1210 may in some cases include separate receivers for the licensed radio frequency spectrum band and the unlicensed radio frequency spectrum band. The separate receivers may, in some examples, take the form of a licensed RF spectrum band LTE/LTE-A receiver module 1212 for communicating over the licensed radio frequency spectrum band, and an unlicensed RF spectrum band LTE/LTE-A receiver module 1214 for communicating over the unlicensed radio frequency spectrum band. The receiver module 1210, including the licensed RF spectrum band LTE/LTE-A receiver module 1212 and/or the unlicensed RF spectrum band LTE/LTE-A receiver module 1214, may be used to receive various types of data and/or control signals (i.e., transmissions) over one or more communication links of a wireless communication system, such as one or more communication links of the wireless communication system 100 and/or 300 described with reference to FIG. 1 and/or 3. The communication links may be established over the licensed radio frequency spectrum band and/or the unlicensed radio frequency spectrum band.

In some examples, the transmitter module 1230 may include at least one RF transmitter, such as at least one RF transmitter operable to transmit over the licensed radio frequency spectrum band and/or the unlicensed radio frequency spectrum band. The transmitter module 1230 may in some cases include separate transmitters for the licensed radio frequency spectrum band and the unlicensed radio frequency spectrum band. The separate transmitters may, in some examples, take the form of a licensed RF spectrum band LTE/LTE-A transmitter module 1232 for communicating over the licensed radio frequency spectrum band, and an unlicensed RF spectrum band LTE/LTE-A transmitter module 1234 for communicating over the unlicensed radio frequency spectrum band. The transmitter module 1230, including the licensed RF spectrum band LTE/LTE-A transmitter module 1232 and/or the unlicensed RF spectrum band LTE/LTE-A transmitter module 1234, may be used to transmit various types of data and/or control signals (i.e., transmissions) over one or more communication links of a wireless communication system, such as one or more communication links of the wireless communication system 100 and/or 300 described with reference to FIG. 1 and/or 3. The communication links may be established over the licensed radio frequency spectrum band and/or the unlicensed radio frequency spectrum band.

In some examples, the wireless communication management module 1220 may be an example of one or more aspects of the wireless communication management module 920 described with reference to FIG. 9. The wireless communication management module 1220 may include a PRS generation module 1235, a PRS configuration module 1240, a PRS transmission module 1245, a known location measurement collection module 1250, a measurement storing/indexing module 1255, a measurement analysis module 1260, and/or a position estimation module 1265. Each of these components may be in communication with each other.

In some examples, the PRS generation module 1235 may be used to generate a PRS. The PRS may in some examples include a number of tones.

In some examples, the PRS configuration module 1240 may be used to configure the PRS in at least one downlink subframe among a plurality of downlink subframes.

In some examples, the PRS transmission module 1245 may be used to transmit the PRS in the at least one downlink subframe using an unlicensed radio frequency spectrum band.

In some examples, the known location measurement collection module 1250 may be used to receive a set of RSTD measurements collected for each of a plurality of known locations. The RSTD measurements may be based at least in part on measurements of the PRS transmitted by the PRS transmission module 1245, and may be received from one or more UEs (e.g., one or more test UEs). In some examples, the known location measurement collection module 1250 may also receive a set of RSSIs for each of the plurality of known locations In some examples, the measurement storing/indexing module 1255 may be used to transmit the received set of measurements (e.g., the set of RSTD measurements and/or RSSIs) to be stored in a database. The measurement storing/indexing module 1255 may also be used to retrieve the measurements for use by the position estimation module 1265.

In some examples, the measurement analysis module 1260 may be used to receive (e.g., from a UE) at least one RSTD measurement and at least one RSSI associated with an unknown location.

In some examples, the position estimation module 1265 may be used to estimate a position of the unknown location based at least in part on the at least one RSTD measurement, the at least one RSSI associated with the unknown location, and the set of measurements stored in the database. In some examples, the position estimation module 1265 may estimate the position using a two-step prediction and tracking process. First, based on previous position estimates, a current position probability may be obtained. This incorporates prediction based on movement. Then, given the current position probability, and the probability of RSTD measurements and RSSIs as a function of position, a probability of the current position given RSTD measurements and RSSI may be determined. The two steps may be described mathematically as:

$$p(L_t) = \sum_{L_{t-1}} p(L_t | L_{t-1}) p(L_{t-1})$$

$$p(L_t | RSTD, RSSI) = p(RSTD, RSSI | L_t) p(L_t)$$

The use of RSTD measurements provides better accuracy and less variability over the use of RSSI measurements alone.

Figure 13:
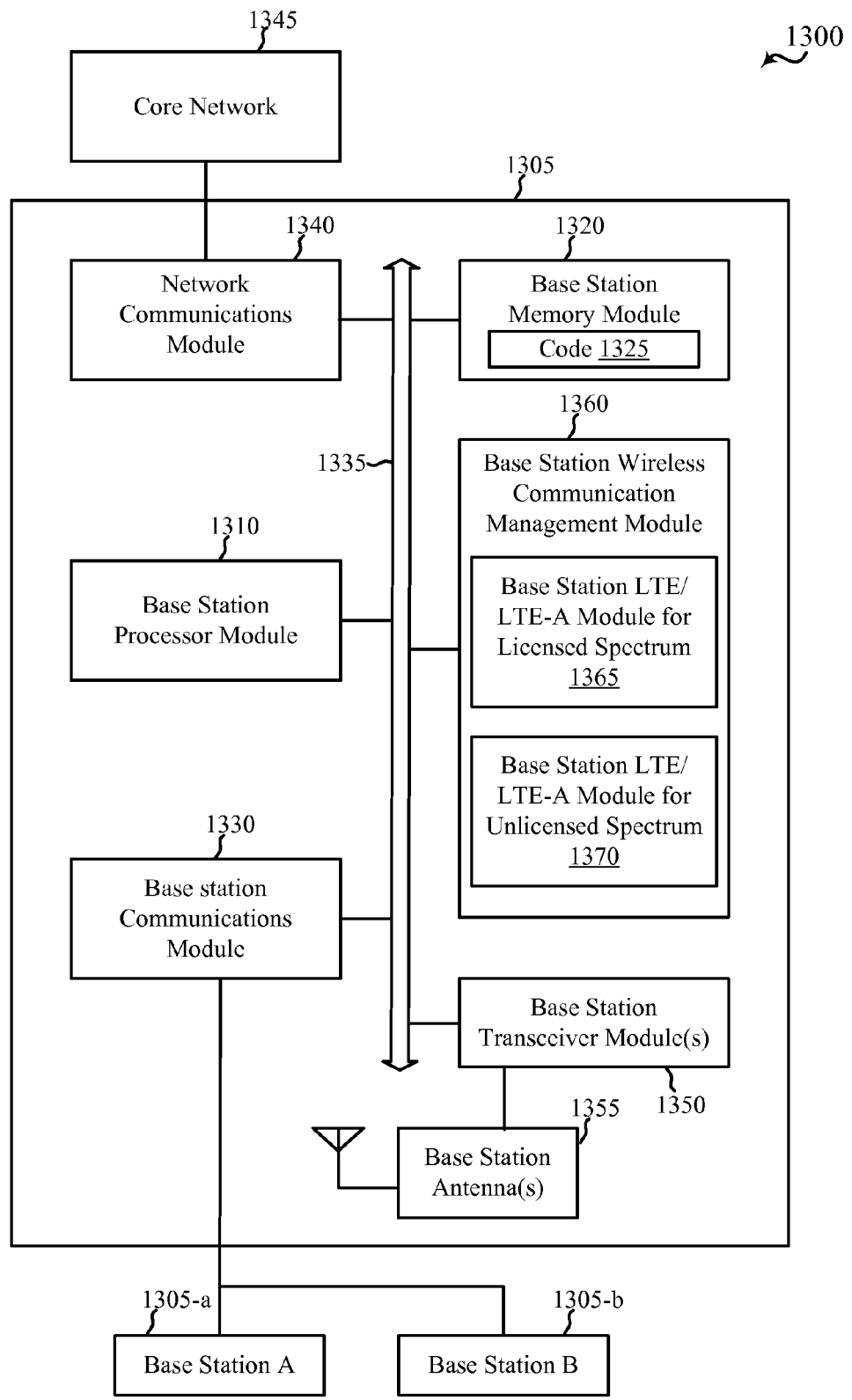
FIG. 13 shows a block diagram of a base station (e.g., a base station forming part or all of an eNB) for use in wireless communication, in accordance with various aspects of the present disclosure.

FIG. 13 shows a block diagram 1300 of a base station 1305 (e.g., a base station forming part or all of an eNB) for use in wireless communication, in accordance with various aspects of the present disclosure. In some examples, the base station 1305 may be an example of one or more aspects of the base station 105, 305, and/or 305-*a* described with reference to FIG. 1 and/or 3, and/or one or more aspects of the apparatus 905, 1005, 1105, and/or 1205 described with reference to FIG. 9, 10, 11, and/or 12 (e.g., when configured as a base station). The base station 1305 may be configured to implement or facilitate at least some of the base station and/or apparatus features and functions described with reference to FIG. 1, 2, 3, 4, 5, 6, 7, and/or 8.

The base station 1305 may include a base station processor module 1310, a base station memory module 1320, at least one base station transceiver module (represented by base station transceiver module(s) 1350), at least one base station antenna (represented by base station antenna(s) 1355), and/or a base station wireless communication management module 1360. The base station 1305 may also include one or more of a base station communications module 1330 and/or a network communications module 1340. Each of these components may be in communication with each other, directly or indirectly, over one or more buses 1335.

The base station memory module 1320 may include random access memory (RAM) and/or read-only memory (ROM). The base station memory module 1320 may store computer-readable, computer-executable code 1325 containing instructions that are configured to, when executed, cause the base station processor module 1310 to perform various functions described herein related to wireless communication and/or PRS transmission. Alternatively, the code 1325 may not be directly executable by the base station processor module 1310 but be configured to cause the base station 1305 (e.g., when compiled and executed) to perform various of the functions described herein.

The base station processor module 1310 may include an intelligent hardware device, e.g., a central processing unit (CPU), a microcontroller, an ASIC, etc. The base station processor module 1310 may process information received through the base station transceiver module(s) 1350, the base station communications module 1330, and/or the network communications module 1340. The base station processor module 1310 may also process information to be sent to the transceiver module(s) 1350 for transmission through the antenna(s) 1355, to the base station communications module 1330, for transmission to one or more other base stations 1305-*a* and 1305-*b*, and/or to the network communications module 1340 for transmission to a core network 1345, which may be an example of one or more aspects of the core network 130 described with reference to FIG. 1. The base station processor module 1310 may handle, alone or in connection with the base station wireless communication management module 1360, various aspects of communicating over (or managing communications over) a first radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) and/or a second radio frequency spectrum band (e.g., a radio frequency spectrum band, such as Wi-Fi radio frequency spectrum band, for which apparatuses may need to contend for access because the radio frequency spectrum band is available for unlicensed use, such as an unlicensed radio frequency spectrum band usable for LTE/LTE-A communications).

The base station transceiver module(s) 1350 may include a modem configured to modulate packets and provide the modulated packets to the base station antenna(s) 1355 for transmission, and to demodulate packets received from the base station antenna(s) 1355. The base station transceiver module(s) 1350 may, in some examples, be implemented as one or more base station transmitter modules and one or more separate base station receiver modules. The base station transceiver module(s) 1350 may support communications in the first radio frequency spectrum band and/or the second radio frequency spectrum band. The base station transceiver module(s) 1350 may be configured to communicate bi-directionally, via the antenna(s) 1355, with one or more mobile stations or apparatuses, such as one or more of the UEs 115 and/or 315 described with reference to FIG. 1 and/or 3. The base station 1305 may, for example, include multiple base station antennas 1355 (e.g., an antenna array). The base station 1305 may communicate with the core network 1345 through the network communications module 1340. The base station 1305 may also communicate with other base stations, such as the base stations 1305-*a* and 1305-*b*, using the base station communications module 1330.

The base station wireless communication management module 1360 may be configured to perform and/or control some or all of the features and/or functions described with reference to FIG. 1, 2, 3, 5, 6, 7, and/or 8 related to wireless communication over the first radio frequency spectrum band and/or the second radio frequency spectrum band. For example, the base station wireless communication management module 1360 may be configured to support a supplemental downlink mode, carrier aggregation mode, and/or standalone mode using the first radio frequency spectrum band and/or the second radio frequency spectrum band. The base station wireless communication management module 1360 may also be configured to transmit a PRS over the first radio frequency spectrum band and/or the second radio frequency spectrum band. The base station wireless communication management module 1360 may include a base station LTE/LTE-A module for licensed spectrum 1365 configured to handle LTE/LTE-A communications in the first radio frequency spectrum band, and a base station LTE/LTE-A module for unlicensed spectrum 1370 configured to handle LTE/LTE-A communications in the second radio frequency spectrum band. The base station wireless communication management module 1360, or portions of it, may include a processor, and/or some or all of the functions of the base station wireless communication management module 1360 may be performed by the base station processor module 1310 and/or in connection with the base station processor module 1310. In some examples, the base station wireless communication management module 1360 may be an example of the wireless communication management module 920, 1020, 1120, and/or 1220 described with reference to FIG. 9, 10, 11, and/or 12.

Figure 14:
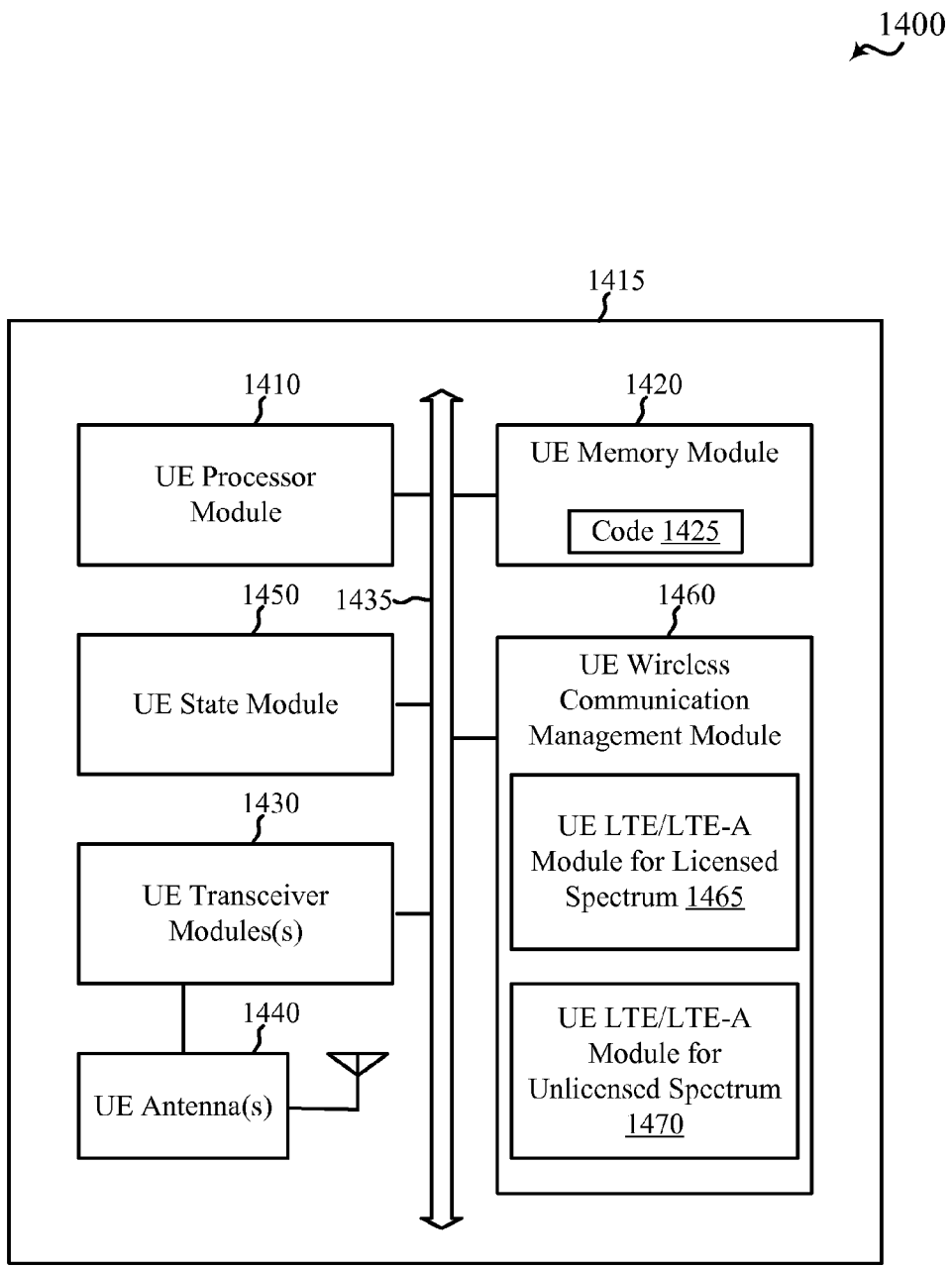
FIG. 14 shows a block diagram of a UE for use in wireless communication, in accordance with various aspects of the present disclosure.

FIG. 14 shows a block diagram 1400 of a UE 1415 for use in wireless communication, in accordance with various aspects of the present disclosure. The UE 1415 may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 1415 may, in some examples, have an internal power supply (not shown), such as a small battery, to facilitate mobile operation. In some examples, the UE 1415 may be an example of one or more aspects of the UE 115, 315, 315-*a*, 315-*b*, and/or 315-*c* described with reference to FIG. 1 and/or 3. The UE 1415 may be configured to implement at least some of the UE and/or apparatus features and functions described with reference to FIG. 1, 2, and/or 3.

The UE 1415 may include a UE processor module 1410, a UE memory module 1420, at least one UE transceiver module (represented by UE transceiver module(s) 1430), at least one UE antenna (represented by UE antenna(s) 1440), and/or a UE wireless communication management module 1460. Each of these components may be in communication with each other, directly or indirectly, over one or more buses 1435.

The UE memory module 1420 may include RAM and/or ROM. The UE memory module 1420 may store computer-readable, computer-executable code 1425 containing instructions that are configured to, when executed, cause the UE processor module 1410 to perform various functions described herein related to wireless communication and/or PRS reception and measurement. Alternatively, the code 1425 may not be directly executable by the UE processor module 1410 but be configured to cause the UE 1415 (e.g., when compiled and executed) to perform various of the functions described herein.

The UE processor module 1410 may include an intelligent hardware device, e.g., a CPU, a microcontroller, an ASIC, etc. The UE processor module 1410 may process information received through the UE transceiver module(s) 1430 and/or information to be sent to the UE transceiver module(s) 1430 for transmission through the UE antenna(s) 1440. The UE processor module 1410 may handle, alone or in connection with the UE wireless communication management module 1460, various aspects of communicating over (or managing communications over) a first radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) and/or a second radio frequency spectrum band (e.g., a radio frequency spectrum band, such as Wi-Fi radio frequency spectrum band, for which apparatuses may need to contend for access because the radio frequency spectrum band is available for unlicensed use, such as an unlicensed radio frequency spectrum band usable for LTE/LTE-A communications).

The UE transceiver module(s) 1430 may include a modem configured to modulate packets and provide the modulated packets to the UE antenna(s) 1440 for transmission, and to demodulate packets received from the UE antenna(s) 1440. The UE transceiver module(s) 1430 may, in some examples, be implemented as one or more UE transmitter modules and one or more separate UE receiver modules. The UE transceiver module(s) 1430 may support communications in the first radio frequency spectrum band and/or the second radio frequency spectrum band. The UE transceiver module(s) 1430 may be configured to communicate bi-directionally, via the UE antenna(s) 1440, with one or more of the base stations 105 and/or 305 described with reference to FIG. 1 and/or 3, and/or the apparatus 905, 1005, 1105, and/or 1205 described with reference to FIG. 9, 10, 11, and/or 12. While the UE 1415 may include a single UE antenna, there may be examples in which the UE 1415 may include multiple UE antennas 1440.

The UE state module 1450 may be used, for example, to manage transitions of the UE 1415 between an RRC idle state and an RRC connected state, and may be in communication with other components of the UE 1415, directly or indirectly, over the one or more buses 1435. The UE state module 1450, or portions of it, may include a processor, and/or some or all of the functions of the UE state module 1450 may be performed by the UE processor module 1410 and/or in connection with the UE processor module 1410.

The UE wireless communication management module 1460 may be configured to perform and/or control some or all of the features and/or functions described with reference to FIG. 1, 2, and/or 3 related to wireless communication and/or PRS transmission over the first radio frequency spectrum band and/or the second radio frequency spectrum band. For example, the UE wireless communication management module 1460 may be configured to support a supplemental downlink mode, carrier aggregation mode, and/or standalone mode using the first radio frequency spectrum band and/or the second radio frequency spectrum band. The UE wireless communication management module 1460 may also be configured to receive a PRS over the first radio frequency spectrum band and/or the second radio frequency spectrum band, perform PRS measurements, and generate and transmit a RSTD report. The UE wireless communication management module 1460 may include a UE LTE/LTE-A module for licensed spectrum 1465 configured to handle LTE/LTE-A communications in the first radio frequency spectrum band, and a UE LTE/LTE-A module for unlicensed spectrum 1470 configured to handle LTE/LTE-A communications in the second radio frequency spectrum. The UE wireless communication management module 1460, or portions of it, may include a processor, and/or some or all of the functions of the UE wireless communication management module 1460 may be performed by the UE processor module 1410 and/or in connection with the UE processor module 1410.

Figure 15:
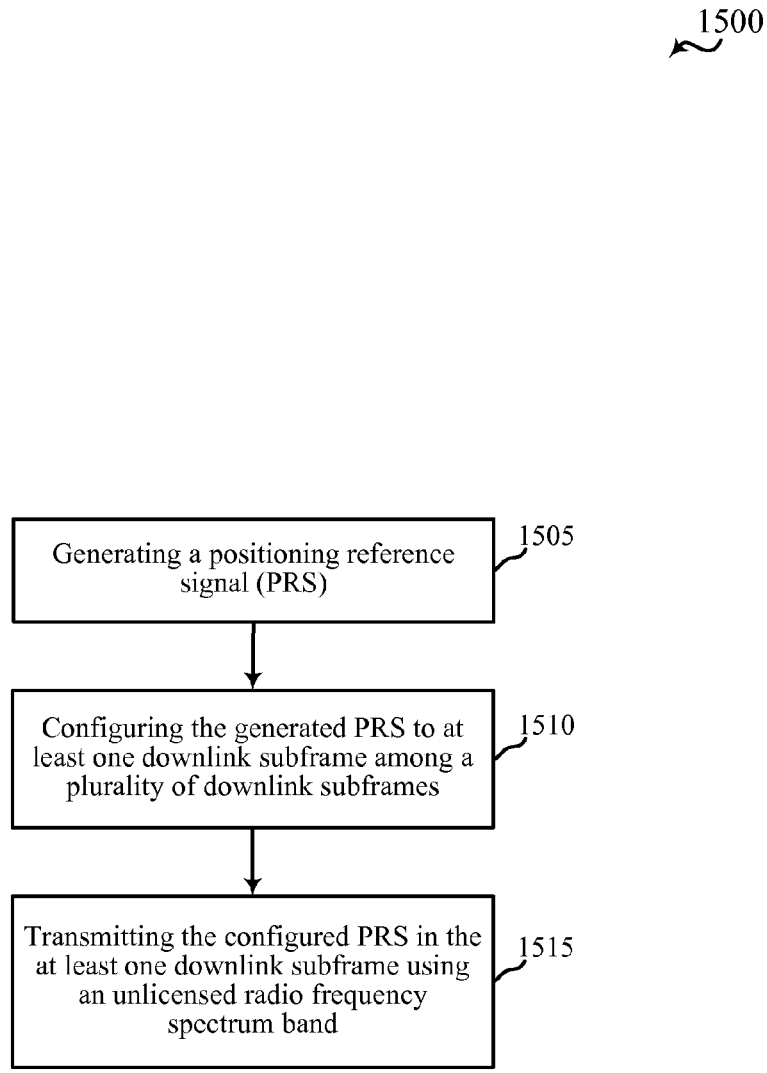
FIG. 15 is a flow chart illustrating an example of a method for wireless communication, in accordance with various aspects of the present disclosure.

FIG. 15 is a flow chart illustrating an example of a method 1500 for wireless communication, in accordance with various aspects of the present disclosure. For clarity, the method 1500 is described below with reference to aspects of one or more of the base stations 105, 305, 305-*a*, and/or 1305 described with reference to FIG. 1, 3, and/or 13, and/or aspects of one or more of the apparatuses 905, 1005, 1105, and/or 1205 described with reference to FIG. 9, 10, 11, and/or 12. In some examples, a base station and/or apparatus may execute one or more sets of codes to control the functional elements of the base station and/or apparatus to perform the functions described below.

At block 1505, the method 1500 may include generating a PRS. The PRS may in some examples include a number of tones. The operation(s) at block 1505 may be performed using the wireless communication management module 920, 1020, and/or 1360 described with reference to FIG. 9, 10, and/or 13, and/or the PRS generation module 935 and/or 1035 described with reference to FIG. 9 and/or 10.

At block 1510, the method 1500 may include configuring the PRS to at least one downlink subframe among a plurality of downlink subframes. The operation(s) at block 1510 may be performed using the wireless communication management module 920, 1020, and/or 1360 described with reference to FIG. 9, 10, and/or 13, and/or the PRS configuration module 940 and/or 1040 described with reference to FIG. 9 and/or 10.

At block 1515, the method 1500 may include transmitting the PRS in the at least one downlink subframe using an unlicensed radio frequency spectrum band (e.g., a radio frequency spectrum band for which apparatuses may need to contend for access because the radio frequency spectrum band is available for unlicensed use, such as Wi-Fi use). The operation(s) at block 1515 may be performed using the wireless communication management module 920, 1020, and/or 1360 described with reference to FIG. 9, 10, and/or 13, and/or the PRS transmission module 945 and/or 1060 described with reference to FIG. 9 and/or 10.

Thus, the method 1500 may provide for wireless communication. It should be noted that the method 1500 is just one implementation and that the operations of the method 1500 may be rearranged or otherwise modified such that other implementations are possible.

Figure 16:
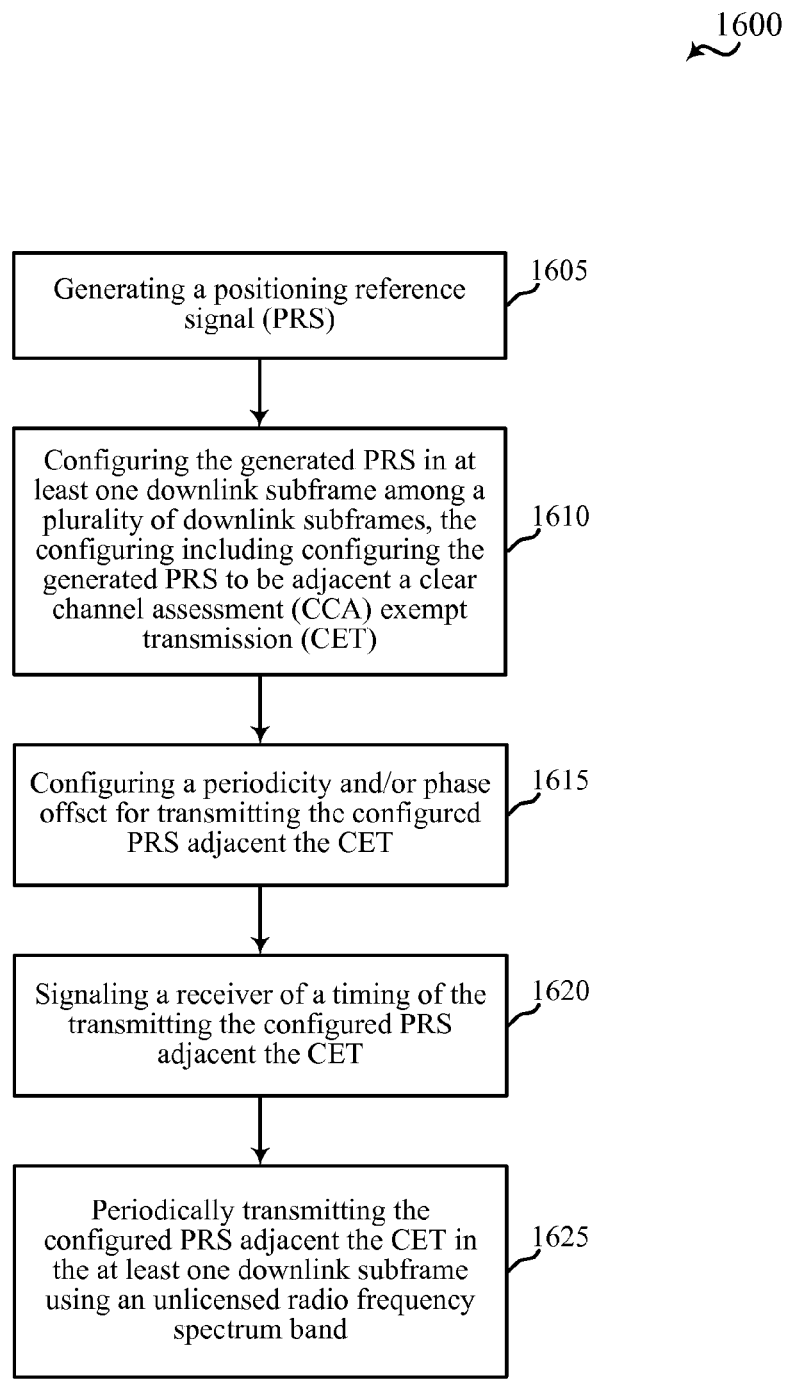
FIG. 16 is a flow chart illustrating an example of a method for wireless communication, in accordance with various aspects of the present disclosure.

FIG. 16 is a flow chart illustrating an example of a method 1600 for wireless communication, in accordance with various aspects of the present disclosure. For clarity, the method 1600 is described below with reference to aspects of one or more of the base stations 105, 305, 305-*a*, and/or 1305 described with reference to FIG. 1, 3, and/or 13, and/or aspects of one or more of the apparatuses 905 and/or 1005 described with reference to FIG. 9 and/or 10. In some examples, a base station and/or apparatus may execute one or more sets of codes to control the functional elements of the base station and/or apparatus to perform the functions described below.

At block 1605, the method 1600 may include generating a PRS. The PRS may in some examples include a number of tones. The operation(s) at block 1605 may be performed using the wireless communication management module 920, 1020, and/or 1360 described with reference to FIG. 9, 10, and/or 13, and/or the PRS generation module 935 and/or 1035 described with reference to FIG. 9 and/or 10.

At block 1610, the method 1600 may include configuring the PRS in at least one downlink subframe among a plurality of downlink subframes. The configuring may include configuring the PRS to be adjacent a CET. In some examples, the PRS may be configured in units of downlink subframes, and may be configured to have a duration of one to K downlink subframes. In some examples, a combined duration of the PRS and the CET may be less than a maximum allowed duration of the CET. In some examples, the maximum allowed duration of the CET may be a percentage of the Transmit On (Tx-ON) during a defined period of time. The operation(s) at block 1610 may be performed using the wireless communication management module 920, 1020, and/or 1360 described with reference to FIG. 9, 10, and/or 13, the PRS configuration module 940 and/or 1040 described with reference to FIG. 9 and/or 10, and/or the PRS duration configuration module 1045 described with reference to FIG. 10.

At block 1615, the method 1600 may include configuring a periodicity and/or phase offset for transmitting the PRS adjacent the CET. In some examples, a first periodicity of transmitting the PRS adjacent the CET may be the same as a second periodicity at which the CET is transmitted (e.g., the PRS may be transmitted every time the CET is transmitted). In other examples, a first periodicity of transmitting the PRS adjacent the CET may differ from a second periodicity at which the CET is transmitted (e.g., the PRS may not be transmitted every time the CET is transmitted, but may be transmitted every J CETs, where the value of J is configurable). In these latter examples, a phase offset for transmitting the PRS adjacent the CET may also be configured. In some cases, a first phase offset used by a first transmitter (e.g., a first base station) to transmit the PRS adjacent the CET may differ from a second phase offset used by a second transmitter (e.g., a second base station) to transmit the PRS adjacent the CET. The first periodicity may be a variable periodicity and the first phase offset may be a variable phase offset, such that the first transmitter may configure a periodicity and phase offset that are useful to the first transmitter and/or its receivers, and/or configure a periodicity and/or phase offset that are the same or different from a periodicity and/or phase offset used by another transmitter (e.g., the second transmitter). Other configurations of periodicity and/or phase offset that may be made by the PRS periodicity configuration module 1050 are described with reference to FIG. 10. The operation(s) at block 1615 may be performed using the wireless communication management module 920, 1020, and/or 1360 described with reference to FIG. 9, 10, and/or 13, and/or the PRS periodicity configuration module 1050 described with reference to FIG. 10.

At block 1620, the method 1600 may include signaling a receiver (e.g., a UE) of a timing of transmitting the PRS adjacent the CET (e.g., a timing of transmitting an impending transmission of the PRS adjacent the CET). The operation(s) at block 1620 may be performed using the wireless communication management module 920, 1020, and/or 1360 described with reference to FIG. 9, 10, and/or 13, and/or the PRS configuration signaling module 1055 described with reference to FIG. 10.

At block 1625, the method 1600 may include periodically transmitting the PRS adjacent the CET in the at least one downlink subframe using an unlicensed radio frequency spectrum band (e.g., a radio frequency spectrum band for which apparatuses may need to contend for access because the radio frequency spectrum band is available for unlicensed use, such as Wi-Fi use). In some examples, the PRS may be transmitted contiguously with the CET (e.g., with no transmission gaps between at least one downlink subframe in which the PRS is transmitted and at least one downlink subframe in which the CET is transmitted). In some examples, periodically transmitting the PRS adjacent the CET may include periodically transmitting the PRS adjacent the CET according to the first periodicity and the first phase offset configured at block 1615. The operation(s) at block 1625 may be performed using the wireless communication management module 920, 1020, and/or 1360 described with reference to FIG. 9, 10, and/or 13, and/or the PRS transmission module 945 and/or 1060 described with reference to FIG. 9 and/or 10.

Configuring the PRS to be adjacent a CET may enable the PRS to leverage the CET property of guaranteed transmission over the unlicensed radio frequency spectrum band. In some examples, the transmitting the PRS may include transmitting the PRS before the CET. In other examples, the transmitting the PRS may include transmitting the PRS after the CET.

In some examples, the transmitting the PRS may include transmitting the PRS to occupy a portion of the unlicensed radio frequency spectrum band, which portion is less than all of the unlicensed radio frequency spectrum band. In these examples, other downlink signals may be transmitted in conjunction with the PRS. The other downlink signals may in some cases be transmitted to meet unlicensed spectrum bandwidth usage requirements, as described with reference to FIG. 7.

In some examples, the transmitting the PRS may include transmitting the PRS across a plurality of frequencies of the unlicensed radio frequency spectrum band, as may be useful in an inter-frequency and/or carrier aggregation transmission scenario. When the relative PRS transmission timing across the plurality of frequencies may be unknown, a timing offset indicating the relative PRS transmission timing across the plurality of frequencies may be signaled to a receiver (e.g., a UE). In some examples, the timing offset may be signaled by the PRS configuration signaling module 1055 described with reference to FIG. 10.

In some examples, the method 1600 may be performed in parallel by a configurable number of transmitters (e.g., by a configurable number of base stations, or by a configurable number of eNBs) as specified by signaling. When a plurality of transmitters are transmitting a PRS, various PRS transmission scenarios are possible. In a first example, the transmitting the PRS (at block 1625) may include time synchronizing the transmitting the PRS, by a first transmitter, with a transmission of at least a second PRS by at least a second transmitter (e.g., at least two transmitters may transmit a PRS at the same time, in a same one or more downlink subframes). In a second example, the transmitting the PRS may include transmitting the PRS before the CET, by the first transmitter, while at least the second transmitter transmits at least a second PRS after a CET. Alternately, the transmitting the PRS may include transmitting the PRS after the CET, by the first transmitter, while at least the second transmitter transmits at least the second PRS before a CET. In either alternative, each PRS may be transmitted adjacent a CET. In a third example, the transmitting the PRS may include transmitting the PRS, by the first transmitter, with a same periodicity as, and a different phase offset than, a transmission of at least the second PRS by at least the second transmitter. In a fourth example, the transmitting the PRS may include transmitting the PRS, by the first transmitter, with a different periodicity than a transmission of at least the second PRS by at least the second transmitter. In a fifth example, the PRS may be associated with a muting parameter and/or a variable cell-specific frequency shift parameter, which muting parameter and/or variable cell-specific frequency shift parameter may be the same as, or different than, a second muting parameter and/or a second variable cell-specific frequency shift parameter associated with at least the second PRS transmitted by at least the second transmitter. In a sixth example, the transmitting the PRS may include transmitting the PRS in accordance with a combination of two or more of the preceding examples.

Thus, the method 1600 may provide for wireless communication. It should be noted that the method 1600 is just one implementation and that the operations of the method 1600 may be rearranged or otherwise modified such that other implementations are possible.

Figure 17:
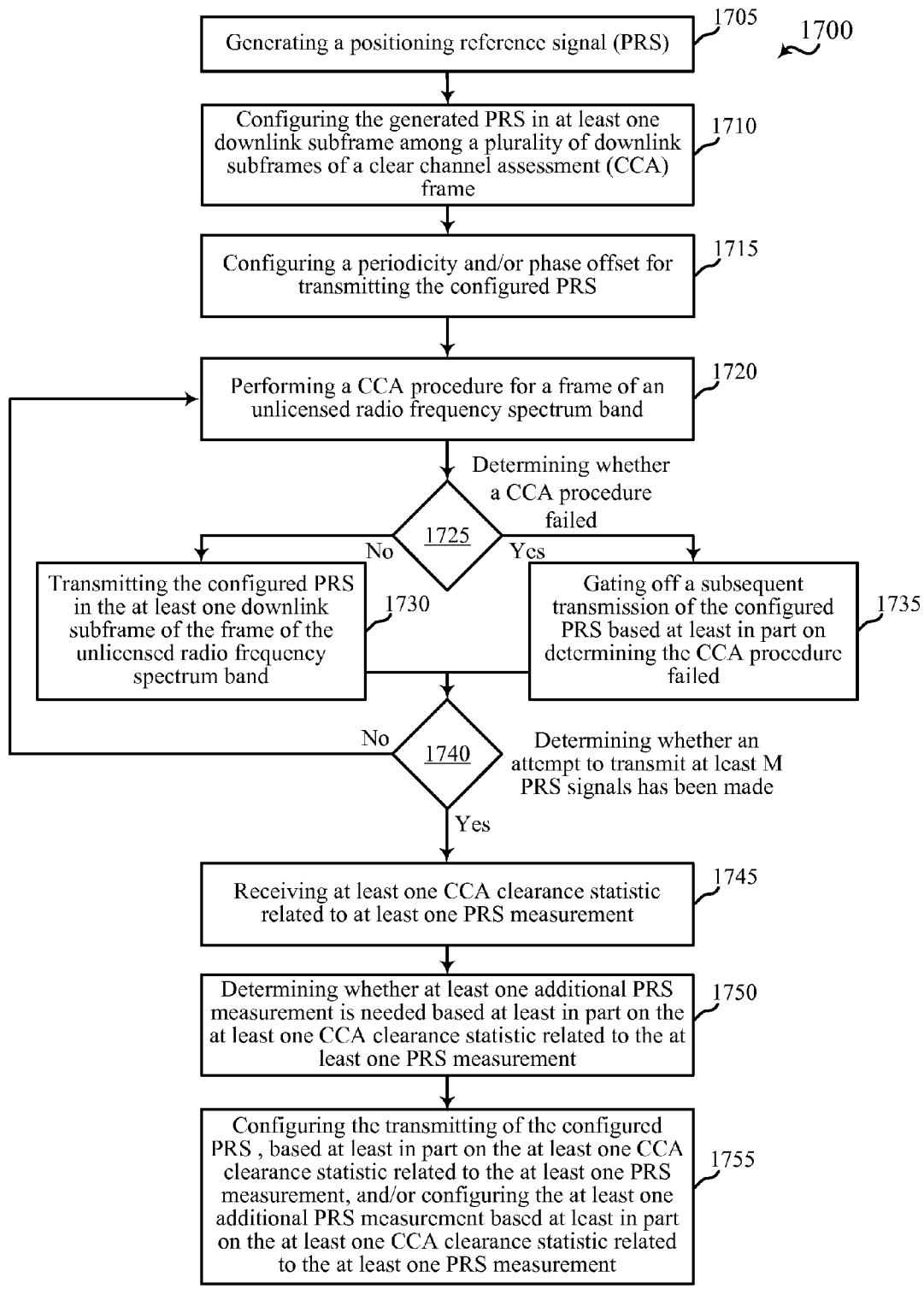
FIG. 17 is a flow chart illustrating an example of a method for wireless communication, in accordance with various aspects of the present disclosure.

FIG. 17 is a flow chart illustrating an example of a method 1700 for wireless communication, in accordance with various aspects of the present disclosure. For clarity, the method 1700 is described below with reference to aspects of one or more of the base stations 105, 305, 305-a, and/or 1305 described with reference to FIG. 1, 3, and/or 13, and/or aspects of one or more of the apparatuses 905 and/or 1105 described with reference to FIG. 9 and/or 11. In some examples, a base station and/or apparatus may execute one or more sets of codes to control the functional elements of the base station and/or apparatus to perform the functions described below.

At block 1705, the method 1700 may include generating a PRS. The PRS may in some examples include a number of tones. The operation(s) at block 1705 may be performed using the wireless communication management module 920, 1120, and/or 1360 described with reference to FIG. 9, 11, and/or 13, and/or the PRS generation module 935 and/or 1135 described with reference to FIG. 9 and/or 11.

At block 1710, the method 1700 may include configuring the PRS in at least one downlink subframe among a plurality of downlink subframes of a CCA frame. PRS configuration parameters that are currently used to configure a PRS in at least one downlink subframe of a licensed radio frequency spectrum band (e.g., duration, periodicity, number of PRS attempts, etc.) may, in some examples, be used to configure a PRS in at least one downlink subframe of an unlicensed radio frequency spectrum band. However, as discussed below, CCA failures may interfere with a strict implementation of some PRS configuration parameters. In some examples, the PRS may be configured in units of downlink subframes, and may be configured to have a duration of one to K downlink subframes. The operation(s) at block 1710 may be performed using the wireless communication management module 920, 1120, and/or 1360 described with reference to FIG. 9, 11, and/or 13, the PRS configuration module 940 and/or 1140 described with reference to FIG. 9 and/or 11, and/or the PRS duration configuration module 1145 described with reference to FIG. 11.

At block 1715, the method 1700 may include configuring a periodicity and/or phase offset for transmitting the PRS. In some cases, a first phase offset used by a first transmitter (e.g., a first base station) to transmit the PRS may differ from a second phase offset used by a second transmitter (e.g., a second base station) to transmit the PRS. The first periodicity may be a variable periodicity and the first phase offset may be a variable phase offset, such that the first transmitter may configure a periodicity and phase offset that are useful to the first transmitter and/or its receivers, and/or configure a periodicity and/or phase offset that are the same or different from a periodicity and/or phase offset used by another transmitter (e.g., the second transmitter). The operation(s) at block 1715 may be performed using the wireless communication management module 920, 1120, and/or 1360 described with reference to FIG.9, 11, and/or 13, and/or the PRS periodicity configuration module 1150 described with reference to FIG. 11.

At block 1720, the method 1700 may include performing a CCA procedure for a frame of an unlicensed radio frequency spectrum band (e.g., a radio frequency spectrum band for which apparatuses may need to contend for access because the radio frequency spectrum band is available for unlicensed use, such as Wi-Fi use). At block 1725, it may be determined whether a CCA procedure performed at block 1720 failed. When it is determined that the CCA procedure did not fail, the method 1700 may proceed to block 1730. When it is determined that the CCA procedure failed, the method 1700 may proceed to block 1735. The operation(s) at block 1720 and/or block 1725 may be performed using the wireless communication management module 920, 1120, and/or 1360 described with reference to FIG.9, 11, and/or 13, and/or the CCA module 1155 described with reference to FIG. 11.

At block 1730, the method 1700 may include transmitting the PRS in the at least one downlink subframe of the frame of the unlicensed radio frequency spectrum band. At block 1735, the method 1700 may include gating off a transmission of the PRS based at least in part on determining the CCA procedure failed. The operation(s) at block 1730 and/or block 1735 may be performed using the wireless communication management module 920, 1120, and/or 1360 described with reference to FIG. 9, 11, and/or 13, and/or the PRS transmission module 945 and/or 1160 described with reference to FIG. 9 and/or 11.

In some examples, the transmitting the PRS may include transmitting the PRS to occupy a portion of the unlicensed radio frequency spectrum band, which portion is less than all of the unlicensed radio frequency spectrum band. In these examples, other downlink signals may be transmitted in conjunction with the PRS. The other downlink signals may in some cases be transmitted to meet unlicensed spectrum bandwidth usage requirements, as described with reference to FIG. 7.

In some examples, the transmitting the PRS may include transmitting the PRS across a plurality of frequencies of the unlicensed radio frequency spectrum band, as may be useful in an inter-frequency and/or carrier aggregation transmission scenario. When the relative PRS transmission timing across the plurality of frequencies may be unknown, a timing offset indicating the relative PRS transmission timing across the plurality of frequencies may be signaled to a receiver (e.g., a UE).

At block 1740, the method 1700 may include determining whether an attempt to transmit at least M PRS signals during a measurement period has been made. If not, the method 1700 may return to block 1720, where a CCA procedure may be performed for a next frame of the unlicensed radio frequency spectrum band in which a PRS is to be transmitted. Otherwise, the method 1700 may proceed to block 1745. An attempt to transmit a PRS may in some cases correspond to performing a CCA procedure for a frame of the unlicensed radio frequency spectrum band in which a PRS is to be transmitted (regardless of whether the CCA procedure fails). The operation(s) at block 1740 may be performed using the wireless communication management module 920, 1120, and/or 1360 described with reference to FIG.9, 11, and/or 13, and/or the PRS measurement configuration module 1170 described with reference to FIG. 11.

At block 1745, the method 1700 may include receiving at least one CCA clearance statistic related to at least one PRS measurement. The at least one CCA clearance statistic may be received, in some examples, from at least one receiver (e.g., at least one UE) and/or at least one transmitter (e.g., at least one base station and/or eNB).

In some examples, a receiver of PRS transmissions may be required to perform a particular number of suitable PRS measurements (e.g., M/2 suitable measurements) within a measurement period before its PRS measurements are deemed useful. This suitable PRS measurement requirement may be met by a receiver performing PRS measurements on the PRS transmissions of one or more transmitters (e.g., one or more base stations and/or eNBs). However, when one or more transmitters fail one or more CCA procedures for frames in which PRS transmissions are to be transmitted, the PRS transmissions are not transmitted and, therefore, a receiver (e.g., a UE) cannot make a suitable PRS measurement for that frame. There may also be instances in which signal interference renders a PRS transmission unusable for measurement purposes. As a result, the transmission of a PRS in a frame for which a CCA procedure needs to be performed increases the likelihood that a receiver will fail the M/2 suitable PRS measurements requirement. To increase the probability that a receiver will pass the M/2 suitable PRS measurements requirement, a receiver may identify frames for which a CCA procedure failed and determine CCA clearance statistics for reporting back to the network (e.g., to a serving cell of a base station and/or eNB). The CCA clearance statistics may be reported, for example, via RSTD measurement results and/or error reporting results. Transmitters (e.g., base stations and/or eNBs) may also identify frames for which a CCA procedure failed and determine CCA clearance statistics for reporting to other transmitters.

The operation(s) at block 1745 may be performed using the wireless communication management module 920, 1120, and/or 1360 described with reference to FIG. 9, 11, and/or 13, and/or the CCA clearance statistics analysis module 1165 described with reference to FIG. 11.

At block 1750, the method 1700 may include determining whether at least one additional PRS measurement is needed based at least in part on the at least one CCA clearance statistic related to the at least one PRS measurement. The operation(s) at block 1750 may be performed using the wireless communication management module 920, 1120, and/or 1360 described with reference to FIG. 9, 11, and/or 13, and/or the PRS measurement configuration module 1170 described with reference to FIG. 11.

At block 1755, the method 1700 may include, when needed, configuring the transmitting the PRS based at least in part on the at least one CCA clearance statistic related to the at least one PRS measurement (e.g., to increase a number of PRS transmissions within a measurement period), and/or configuring the at least one additional PRS measurement based at least in part on the at least one CCA clearance statistic related to the at least one PRS measurement.

In some examples, the number of PRS transmissions may be increased while maintaining, for example, an M/2 suitable measurements requirement for PRS measurements to be deemed useful. In these examples, the greater number of PRS transmissions may increase the likelihood that a receiver will be able to meet the M/2 suitable measurements requirement. Changes in other configuration parameters (e.g., PRS duration) may also be made to increase the likelihood that a receiver will be able to meet the M/2 suitable measurements requirement.

After changing one or more configuration parameters associated with PRS transmissions, a receiver may be requested (e.g., via a network, eNB, and/or base station) to redo its PRS measurements and/or make additional PRS measurements. In the latter case, and by way of example, a network may schedule additional PRS measurements for a receiver, but indicate to the receiver that prior PRS measurements may be used (or are to be used) in a cumulative manner in formulating an RSTD result.

The operation(s) at block 1755 may be performed using the wireless communication management module 920, 1120, and/or 1360 described with reference to FIG. 9, 11, and/or 13, and/or the PRS measurement configuration module 1170 described with reference to FIG. 11.

Thus, the method 1700 may provide for wireless communication. It should be noted that the method 1700 is just one implementation and that the operations of the method 1700 may be rearranged or otherwise modified such that other implementations are possible.

Figure 18:
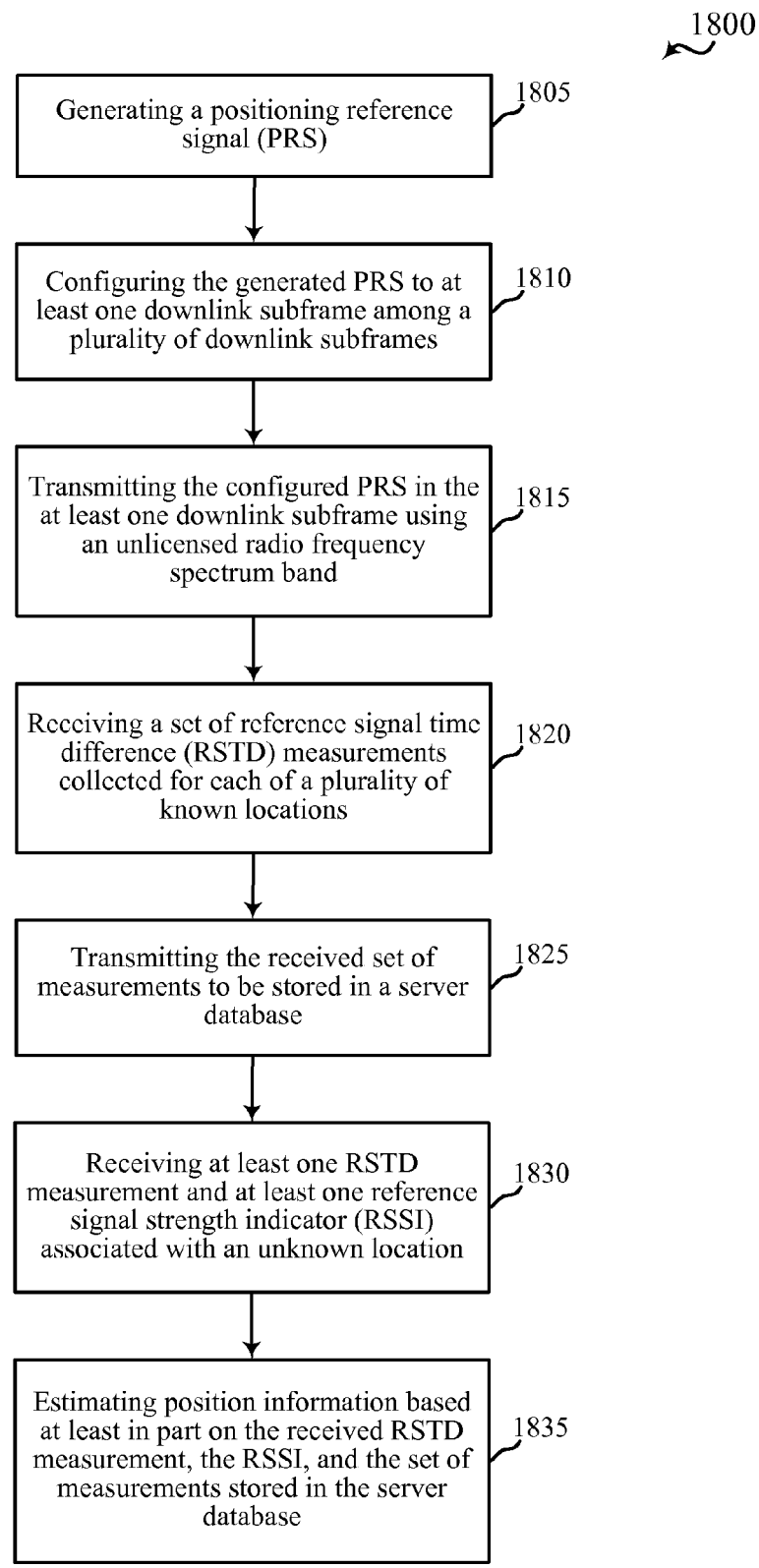
FIG. 18 is a flow chart illustrating an example of a method for wireless communication, in accordance with various aspects of the present disclosure.

FIG. 18 is a flow chart illustrating an example of a method 1800 for wireless communication, in accordance with various aspects of the present disclosure. For clarity, the method 1800 is described below with reference to aspects of one or more of the base stations 105, 305, 305-a, and/or 1305 described with reference to FIG. 1, 3, and/or 13, and/or aspects of one or more of the apparatuses 905 and/or 1205 described with reference to FIG. 9 and/or 12. In some examples, a base station and/or apparatus may execute one or more sets of codes to control the functional elements of the base station and/or apparatus to perform the functions described below.

In environments where the locations of PRS transmitters are not known, PRS measurements may not be usable to determine the position of a receiver by conventional triangulation. The method 1800 may be used to determine the position of a receiver in such environments. The method 1800 may be particularly useful in environments in which a receiver operates in a standalone mode with respect to an unlicensed radio frequency spectrum band (e.g., a radio frequency spectrum band for which apparatuses may need to contend for access because the radio frequency spectrum band is available for unlicensed use, such as Wi-Fi use).

At block 1805, the method 1800 may include generating a PRS. The PRS may in some examples include a number of tones. The operation(s) at block 1805 may be performed using the wireless communication management module 920, 1220, and/or 1360 described with reference to FIG. 9, 12, and/or 13, and/or the PRS generation module 935 and/or 1235 described with reference to FIG. 9 and/or 12.

At block 1810, the method 1800 may include configuring the PRS to at least one downlink subframe among a plurality of downlink subframes. The operation(s) at block 1810 may be performed using the wireless communication management module 920, 1220, and/or 1360 described with reference to FIG. 9, 12, and/or 13, and/or the PRS configuration module 940 and/or 1240 described with reference to FIG. 9 and/or 12.

At block 1815, the method 1800 may include transmitting the PRS in the at least one downlink subframe using an unlicensed radio frequency spectrum band. The operation(s) at block 1815 may be performed using the wireless communication management module 920, 1220, and/or 1360 described with reference to FIG. 9, 12, and/or 13, and/or the PRS transmission module 945 and/or 1245 described with reference to FIG. 9 and/or 12.

At block 1820, the method 1800 may include receiving a set of RSTD measurements collected for each of a plurality of known locations. The RSTD measurements may be based at least in part on measurements of the PRS transmitted at block 1815, and may be received from one or more UEs (e.g., one or more test UEs). In some examples, block 1820 of the method 1800 may also include receiving a set of RSSIs for each of the plurality of known locations. The operation(s) at block 1820 may be performed using the wireless communication management module 920, 1220, and/or 1360 described with reference to FIG.9, 12, and/or 13, and/or the known location measurement collection module 1250 described with reference to FIG. 12.

At block 1825, the method 1800 may include transmitting the received set of measurements (e.g., the set of RSTD measurements and/or RSSIs) to be stored in a database. The operation(s) at block 1825 may be performed using the wireless communication management module 920, 1220, and/or 1360 described with reference to FIG. 9, 12, and/or 13, and/or the measurement storing/indexing module 1255 described with reference to FIG. 12.

At block 1830, the method 1800 may include receiving (e.g., from a UE) at least one RSTD measurement and at least one RSSI associated with an unknown location. The operation(s) at block 1830 may be performed using the wireless communication management module 920, 1220, and/or 1360 described with reference to FIG. 9, 12, and/or 13, and/or the measurement analysis module 1260 described with reference to FIG. 12.

At block 1835, the method 1800 may include estimating a position of the unknown location based at least in part on the at least one RSTD measurement, the at least one RSSI associated with the unknown location, and the set of measurements stored in the database. In some examples, the position may be estimated using a two-step prediction and tracking process. First, based on previous position estimates, a current position probability may be obtained. This incorporates prediction based on movement. Then, given the current position probability, and the probability of RSTD measurements and RSSIs as a function of position, a probability of the current position given RSTD measurements and RSSI may be determined. The two steps may be described mathematically as:

$$p(L_t) = \sum_{L_{t-1}} p(L_t \mid L_{t-1}) p(L_{t-1})$$

-continued $$p(L_t \mid RSTD, RSSI) = p(RSTD, RSSI \mid L_t)p(L_t)$$

The use of RSTD measurements provides better accuracy and less variability over the use of RSSI measurements alone.

The operation(s) at block 1835 may be performed using the wireless communication management module 920, 1220, and/or 1360 described with reference to FIG. 9, 12, and/or 13, and/or the position estimation module 1265 described with reference to FIG. 12.

Thus, the method 1800 may provide for wireless communication. It should be noted that the method 1800 is just one implementation and that the operations of the method 1800 may be rearranged or otherwise modified such that other implementations are possible.

In some examples, aspects of one or more of the methods 1500, 1600, 1700, and/or 1800 may be combined.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication, comprising:
   generating a positioning reference signal (PRS);
   configuring the PRS in at least one downlink subframe among a plurality of downlink subframes, wherein the PRS is configured in the at least one downlink subframe in an unlicensed radio frequency spectrum band to be adjacent a clear channel assessment (CCA) exempt transmission (CET) in the unlicensed radio frequency spectrum band; and
   transmitting the configured PRS in the at least one downlink subframe using the unlicensed radio frequency spectrum band.

2. The method of claim 1, wherein a combined duration of the configured PRS and the CET is less than a maximum allowed duration of the CET in the unlicensed radio frequency spectrum band.

3. The method of claim 1, wherein the transmitting the configured PRS comprises:

periodically transmitting the configured PRS adjacent the CET.

4. The method of claim 3, wherein the periodically transmitting the configured PRS adjacent the CET comprises:
transmitting the configured PRS adjacent the CET according to a first periodicity, the first periodicity differing from a second periodicity at which the CET is transmitted.

5. The method of claim 4, wherein the first periodicity is a variable periodicity.

6. The method of claim 1, further comprising:
signaling a timing of the transmitting the configured PRS to a receiver.

7. The method of claim 1, wherein the transmitting the configured PRS comprises:
transmitting the configured PRS contiguously with the CET.

8. The method of claim 1, wherein the transmitting the configured PRS comprises:
time synchronizing the transmitting the configured PRS, by a first transmitter, with a transmission of at least a second PRS by at least a second transmitter.

9. The method of claim 1, wherein the transmitting the configured PRS comprises:
transmitting the configured PRS, by a first transmitter, with a same periodicity as, and different phase offset than, a transmission of at least a second PRS by at least a second transmitter.

10. The method of claim 1, wherein the transmitting the configured PRS comprises:
transmitting the configured PRS, by a first transmitter, with a different periodicity than a transmission of at least a second PRS by at least a second transmitter.

11. The method of claim 1, wherein the transmitting the configured PRS comprises:
transmitting the configured PRS before the CET.

12. The method of claim 1, wherein the transmitting the configured PRS comprises:
transmitting the configured PRS after the CET.

13. The method of claim 1, further comprising:
associating the PRS with a muting parameter.

14. The method of claim 1, further comprising:
associating the PRS with a variable cell-specific frequency shift parameter.

15. The method of claim 1, wherein the transmitting the configured PRS comprises:
transmitting the configured PRS to occupy a portion of the unlicensed radio frequency spectrum band less than all of the unlicensed radio frequency spectrum band.

16. The method of claim 1, wherein the transmitting the configured PRS comprises:
transmitting the configured PRS across a plurality of frequencies of the unlicensed radio frequency spectrum band.

17. The method of claim 1, further comprising:
receiving at least one CCA clearance statistic related to at least one PRS measurement; and
determining to configure the PRS based at least in part on the at least one CCA clearance statistic related to the at least one PRS measurement.

18. The method of claim 17, wherein the at least one CCA clearance statistic related to the at least one PRS measurement is received from at least one user equipment.

19. The method of claim 17, wherein the at least one CCA clearance statistic related to the at least one PRS measurement is received from at least one evolved NodeB (eNB).

20. The method of claim 1, further comprising:
transmitting an indication to a receiver to use prior RSTD measurements based at least in part on a prior PRS transmission.

21. The method of claim 1, further comprising:
receiving a set of reference signal time difference (RSTD) measurements collected for each of a plurality of known locations; and
transmitting the received set of RSTD measurements to be stored in a database.

22. The method of claim 21, further comprising:
receiving at least one RSTD measurement and at least one reference signal strength indicator (RSSI) associated with an unknown location; and
estimating a position of the unknown location based at least in part on the at least one RSTD measurement and the at least one RSSI associated with the unknown location, and the set of RSTD measurements stored in the database.

23. An apparatus for wireless communication, comprising:
means for generating a positioning reference signal (PRS);
means for configuring the PRS in at least one downlink subframe among a plurality of downlink subframes, wherein the PRS is configured in the at least one downlink subframe in an unlicensed radio frequency spectrum band to be adjacent a clear channel assessment (CCA) exempt transmission (CET) in the unlicensed radio frequency spectrum band; and
means for transmitting the configured PRS in the at least one downlink subframe using the unlicensed radio frequency spectrum band.

24. An apparatus for wireless communication, comprising:
a processor;
memory in electronic communication with the processor; and
instructions stored in the memory, the instructions being executable by the processor to:
generate a positioning reference signal (PRS);
configure the PRS in at least one downlink subframe among a plurality of downlink subframes, wherein the PRS is configured in the at least one downlink subframe in an unlicensed radio frequency spectrum band to be adjacent a clear channel assessment (CCA) exempt transmission (CET) in the unlicensed radio frequency spectrum band; and
transmit the configured PRS in the at least one downlink subframe using the unlicensed radio frequency spectrum band.

25. The apparatus of claim 24, wherein a combined duration of the configured PRS and the CET is less than a maximum allowed duration of the CET in the unlicensed radio frequency spectrum band.

26. The apparatus of claim 24, wherein the instructions to transmit the configured PRS are executable by the processor to:
periodically transmit the configured PRS adjacent the CET according to a first periodicity, the first periodicity differing from a second periodicity at which the CET is transmitted.

27. The apparatus of claim 24, wherein the instructions to transmit the configured PRS are executable by the processor to:

time synchronize transmitting the configured PRS, by a first transmitter, with a transmission of at least a second PRS by at least a second transmitter.

28. The apparatus of claim 24, wherein the instructions are executable by the processor to:

transmit the configured PRS, by a first transmitter, with a same periodicity as, and different phase offset than, a transmission of at least a second PRS by at least a second transmitter.

29. The apparatus of claim 24, wherein the instructions to transmit the configured PRS are executable by the processor to:

transmit the configured PRS, by a first transmitter, with a different periodicity than a transmission of at least a second PRS by at least a second transmitter.

30. A non-transitory computer-readable medium storing computer-executable code for wireless communications, the code executable by a processor to:

generate a positioning reference signal (PRS);

configure the PRS in at least one downlink subframe among a plurality of downlink subframes, wherein the PRS is configured in the at least one downlink subframe in an unlicensed radio frequency spectrum band to be adjacent a clear channel assessment (CCA) exempt transmission (CET) in the unlicensed radio frequency spectrum band; and transmit the configured PRS in the at least one downlink subframe using the unlicensed radio frequency spectrum band.

* * * * *